(12) United States Patent
Driscoll

(10) Patent No.: US 10,028,514 B2
(45) Date of Patent: Jul. 24, 2018

(54) ROBOTIC CARCASS PROCESSING METHOD AND SYSTEM

(71) Applicant: JARVIS PRODUCTS CORPORATION, Middletown, CT (US)

(72) Inventor: Daniel Driscoll, Middletown, CT (US)

(73) Assignee: JARVIS PRODUCTS CORPORATION, Middletown, CT (US)

(*) Notice: Subject to any disclaimer, the term of this patent is extended or adjusted under 35 U.S.C. 154(b) by 0 days.

(21) Appl. No.: 14/719,862

(22) PCT Filed: May 1, 2015

(86) PCT No.: PCT/US2015/028725
§ 371 (c)(1),
(2) Date: May 22, 2015

(87) PCT Pub. No.: WO2015/168511
PCT Pub. Date: Nov. 5, 2015

(65) Prior Publication Data
US 2017/0049116 A1 Feb. 23, 2017

Related U.S. Application Data

(60) Provisional application No. 61/987,024, filed on May 1, 2014.

(51) Int. Cl.
*A22B 5/00* (2006.01)
*A22B 5/20* (2006.01)
(52) U.S. Cl.
CPC ............ *A22B 5/0041* (2013.01); *A22B 5/202* (2013.01); *A22B 5/208* (2013.01)

(58) Field of Classification Search
CPC ....... A22B 5/0017; A22B 5/00; A22B 5/0005; A22B 5/0023; A22B 5/0029;
(Continued)

(56) References Cited

U.S. PATENT DOCUMENTS 4,507,822 A * 4/1985 Herubel ................. A22B 5/202
452/160
4,653,150 A * 3/1987 Leining .................. A22B 5/205
452/160
(Continued)

FOREIGN PATENT DOCUMENTS

EP 2057901 A1 5/2009
WO 2014036547 A1 9/2013

OTHER PUBLICATIONS

"Automated Beef Splitting—Stage 2", MAR-Final Report P.PSH.0526; Gavin Inglis, MAR Jan. 2011, Published by Meat & Livestock Australia Limited, Locked Bag 991, North Sydney NSW 2059, pp. 1-29.
(Continued)

Primary Examiner — Richard T Price, Jr.
(74) Attorney, Agent, or Firm — DeLio, Peterson & Curcio, LLC; Peter W. Peterson

(57) ABSTRACT

A robotic carcass processing system uses a pair of robotic arms having multiple axes of motion, a saw mounted thereon, and a controller. The controller moves the saw in Cartesian space via inverse kinematics with interpolation control over the multiple axes of the robotic arm to synchronously move the saw relative to a carcass on an assembly line. The controller also determines when one of the robotic arms has moved its saw out of a defined space to indicate that space is clear and to permit the other robotic arm to enter that space. A sensor on the assembly line identifies location of the absence of a supported carcass, a supported carcass that requires special handling, or weight
(Continued)

or length of a carcass. The controller sends a signal to the robotic arms to either effect a standard cut or to modify the standard cut at the identified location or carcass.

54 Claims, 16 Drawing Sheets

(58) Field of Classification Search
CPC ......... A22B 5/0041; A22B 5/20; A22B 5/203; A22B 5/205; A22B 5/206; A22C 17/0006
USPC .......................................... 452/149–157, 160
See application file for complete search history.

(56) References Cited

U.S. PATENT DOCUMENTS

| | | | | |
|---|---|---|---|---|
| 5,205,779 | A * | 4/1993 | O'Brien | A22B 5/0005 |
| | | | | 452/155 |
| 5,334,084 | A * | 8/1994 | O'Brien | A22B 5/0005 |
| | | | | 452/134 |
| 5,372,540 | A * | 12/1994 | Burch | B23Q 1/00 |
| | | | | 452/156 |
| 5,626,515 | A * | 5/1997 | Krogh | A22B 5/0017 |
| | | | | 452/160 |
| 6,027,405 | A * | 2/2000 | Leining | A22B 5/205 |
| | | | | 452/152 |
| 6,126,536 | A | 10/2000 | Kielwasser | |
| 6,244,951 | B1 | 6/2001 | Leining | |
| 6,623,348 | B1 | 9/2003 | O'Neill | |
| 6,845,295 | B2 | 1/2005 | Cheng et al. | |
| 6,922,611 | B2 | 7/2005 | Lapham | |
| 7,285,040 | B2 | 10/2007 | Ilch et al. | |
| 7,404,759 | B2 * | 7/2008 | Sato | A22B 5/0041 |
| | | | | 452/157 |
| 7,558,647 | B2 | 7/2009 | Okazaki | |
| 8,986,081 | B2 * | 3/2015 | Ueffing | A22B 5/0041 |
| | | | | 452/156 |
| 8,992,290 | B2 * | 3/2015 | Taniguchi | A22C 17/004 |
| | | | | 452/135 |
| 2007/0232213 | A1 | 10/2007 | Clifford et al. | |
| 2009/0124186 | A1 | 5/2009 | Klein | |
| 2010/0003909 | A1 | 1/2010 | Seaton | |
| 2010/0297923 | A1 | 11/2010 | Brown | |
| 2010/0317273 | A1 | 12/2010 | Knopik et al. | |
| 2012/0006651 | A1 | 1/2012 | Cote | |
| 2012/0040597 | A1 | 2/2012 | Fern et al. | |
| 2013/0303065 | A1 | 11/2013 | Ueffing et al. | |
| 2013/0325030 | A1 | 12/2013 | Hourtash et al. | |

OTHER PUBLICATIONS

"Robotic Beef Splitting—Cutting Trials", MAR-Final Report P.PSH.0277; Simon Gartside and Stuart Shaw Machinery Automation & Robotics Pty Ltd, Apr. 2009, Published by Meat & Livestock Australia Limited, Locked Bag 991 North Sydney NSAW 2059, PP. 1-21.

* cited by examiner

ROBOTIC CARCASS PROCESSING METHOD AND SYSTEM

This application claims priority to PCT application no. PCT/US2015/028725 filed May 1, 2015, which claims priority to U.S. application No. 61/987,024 filed on May 1, 2014.

BACKGROUND OF THE INVENTION

1. Field of the Invention

This invention relates to robotic carcass processing systems in which a robotic arm, having a carcass processing tool attached, is driven by a robotic controller to process a carcass, typically to split the backbone of the carcass as it is continuously moved along a carcass rail in a carcass processing facility.

2. Description of Related Art

Hog carcasses are cleaned and opened to remove internal components, and then split down the center of the spine or backbone into two sides, which are subsequently further processed into meat cuts. Meat processing facilities such as those that process hogs, operate on carcasses that continuously move along an overhead carcass rail. Each carcass is suspended, typically from its hind legs, from a trolley that rides along the overhead carcass rail or track. The trolleys are driven by a chain so that each carcass moves past each processing station at a speed set by the chain. It is the splitting of the carcass down the backbone to which the system and method of the present invention are particularly directed, although the system may be used for other processing of carcasses, whether suspended or not, that travel along a line for processing.

In U.S. hog carcass processing facilities, it is common for the head of the animal to remain attached to one side of the carcass. It is important that the backbone be fully severed while at least a portion of the back strap adjacent to the backbone be maintained intact so that the supporting trolley not become unbalanced. In European-style processing, where the severed head is held to the carcass by jowls on both sides, it is important that the backbone splitting saw not cut into or nick the head, to avoid damage thereto. Manual adjustment must often be made to the depth and stroke of the splitting saw in either system to ensure that problems do not occur.

In some instances, a particular carcass requires special handling such as further inspection before splitting. In other instances, a trolley or carcass is missing at a particular location along the interval. In either case, the production machinery must be manually stopped or adjusted when the special handling carcass or gap in the production line arrives at a splitting station.

A robotically controlled processing tool has been proposed for splitting hog carcasses. However, either the assembly line has to be stopped at the tool to effect the splitting operation, or the processing tool has to be mounted on a moving platform alongside the assembly line. Both of such alternatives are problematic, either as to production efficiency or complexity of hardware. It is also important that the robotic arm on which the processing tool is mounted be properly controlled to avoid damage.

SUMMARY OF THE INVENTION

Bearing in mind the problems and deficiencies of the prior art, it is therefore an object of the present invention to provide a method and system for processing animal carcasses that permits robot stations to be used at stationary base positions to process animal carcasses, including splitting suspended hog or beef carcasses, and maintain control of movement of the processing tool while the carcasses are continuously moving along an assembly line.

It is another object of the present invention to provide a method and system for processing animal carcasses that provides information on the relative location of a supported carcass that requires special handling, or the absence of a carcass on the assembly line, which then is used to control downstream processing tools.

A further object of the invention is to provide a method and system for processing hog carcasses that provides control over the saw cutting movement to properly cut the backbones of hog carcasses in either U.S. or European style carcass processing.

It is yet another object of the present invention to provide a method and system for processing animal carcasses that permits the system to know which carcasses have been processed and which have not been processed, so that proper instructions may be given automatically to a robot station to effect or not effect processing of a particular carcass.

It is a further object of the present invention to provide a method and system for processing animal carcasses that enables robotic arms of closely spaced robot stations to operate without interference with each other.

Still other objects and advantages of the invention will in part be obvious and will in part be apparent from the specification.

The above and other objects, which will be apparent to those skilled in the art, are achieved in the present invention which is directed in a first aspect to a method of controlling a robotic carcass processing system comprising providing a line of carcasses to be processed, the line moving the carcasses past a processing station, providing at the processing station on one side of the line a robotic arm having multiple axes of motion and a carcass processing tool mounted to the robotic arm, and providing a robotic controller in communication with the robotic arm and the back support for controlling and moving the multiple axes of the robotic arm to move the carcass processing tool in Cartesian space via inverse kinematics and having interpolation control over the multiple axes of the robotic arm. The method includes continuously moving a plurality of carcasses on the line sequentially past the processing station and, while a selected carcass is passing the processing station, synchronously moving the back support relative to the selected carcass and using the controller to move the carcass processing tool in Cartesian space via inverse kinematics and having interpolation control over the multiple axes of the robotic arm to synchronously move the carcass processing tool relative to the selected carcass and the back support as the selected carcass moves continuously on the line sequentially past the processing station.

The method may further include providing at the processing station on the other side of the line a back support having multiple axes of motion for supporting a carcass during processing, the back support moving with the carcass processing tool relative to a selected carcass to be processed. The controller may have interpolation control over the multiple axes of the back support to synchronously move the carcass processing tool and the back support relative to the selected carcass as the selected carcass moves continuously on the line sequentially past the processing station.

The robotic arm may have a plurality of links and a plurality of moveable joints connected to the links, and the controller may move the plurality of moveable joints to maintain the carcass processing tool synchronously with the selected carcass in the direction along the line of carcasses to process the selected carcass. The robotic arm may be moveably connected to a stationary base, and after processing the selected carcass in the line of carcasses, the controller may move the robotic arm along a first axis upstream along the line of carcasses and moves the plurality of moveable joints to maintain the carcass processing tool synchronously along the first axis with another selected carcass in the direction along the line of carcasses to process the other selected carcass.

The carcass may be a hog carcass, the carcass processing tool may be a splitting saw and the back support may be a back roller. The robotic arm may comprise a plurality of links and a plurality of moveable joints connected to the links, and the splitting saw may be extended and retracted from the robotic arm. The controller: a) moves the plurality of moveable joints to maintain the splitting saw synchronously along a first axis with the selected carcass in the direction along the line of carcasses being processed; b) simultaneously moves the plurality of moveable joints to: i) extend the splitting saw along a second axis to contact the selected hog carcass, ii) move the saw along a third axis in a direction normal to the line of carcasses to make a desired cut on the selected hog carcass, and iii) retract the splitting saw from the selected hog carcass along the second axis after the desired cut is made; and c) after processing the selected hog carcass in the line of carcasses, moves the robotic arm along the first axis upstream along the line of carcasses to another selected hog carcass and repeats steps (a) and (b) to process the other selected hog carcass.

The carcass may be a beef carcass, and the carcass processing tool may be a band saw.

The present invention is directed in a related aspect to a robotic controlled carcass processing system comprising a robotic arm having multiple axes of motion, a carcass processing tool mounted to the robotic arm, and a robotic controller. The controller may control and move the multiple axes of the robotic arm to move the carcass processing tool in Cartesian space via inverse kinematics and have interpolation control over the multiple axes of the robotic arm to synchronously move the carcass processing tool relative to a selected carcass to be processed.

The system may further include a back support having multiple axes of motion moveable with the carcass processing tool relative to a selected carcass to be processed. The robotic controller further may have interpolation control over the multiple axes of the back support to synchronously move the carcass processing tool and the back support relative to a selected carcass to be processed.

The system may process carcasses moving along a line, and the robotic arm may have a plurality of links and a plurality of moveable joints connected to the links. The controller moves the plurality of moveable joints to maintain the carcass processing tool synchronously with the selected carcass in the direction along the line of carcasses to process the selected carcass. The robotic arm may be moveably connected to a stationary base, and after processing the selected carcass in the line of carcasses, the controller may move the robotic arm along a first axis upstream along the line of carcasses and the controller may move the plurality of moveable joints to maintain the carcass processing tool synchronously along the first axis with another selected carcass in the direction along the line of carcasses to process the other selected carcass.

The carcass may be a hog, the carcass processing tool may be a splitting saw and the back support may be a back roller.

The system may process carcasses moving along a line, the robotic arm may have a plurality of links and a plurality of moveable joints connected to the links, and the splitting saw may be extended and retracted from the robotic arm. The controller: a) moves the plurality of moveable joints to maintain the splitting saw synchronously along a first axis with a selected carcass in the direction along the line of carcasses being processed; b) simultaneously moves the plurality of moveable joints to: i) extend the splitting saw along a second axis to contact the selected hog carcass, ii) move the saw along a third axis in a direction normal to the line of carcasses to make a desired cut on the selected hog carcass, and iii) retract the splitting saw from the selected hog carcass along the second axis after the desired cut is made; and c) after processing the selected hog carcass in the line of carcasses, moves the robotic arm along the first axis upstream along the line of carcasses to another selected hog carcass and repeats steps (a) and (b) to process the other selected hog carcass.

In another aspect the present invention is directed to a method of controlling a robotic carcass processing system comprising providing a line of carcasses to be processed, the line moving the carcasses past a processing station, providing at the processing station along the line at least two robotic arms, each having multiple axes of motion and at least two carcass processing tools, one mounted to each of the robotic arms, and providing a robotic controller for controlling and moving the multiple axes of the at least two robotic arms and their respective carcass processing tools. The method includes defining a space encompassing physical space needed for movement of each robotic arm and its respective carcass processing tool during processing of a selected carcass along the line. The method further includes using the robotic controller to determine when one of the at least two robotic arms has moved its respective carcass processing tool out of its respective defined space to indicate that space is clear and to permit one of the other at least two robotic arms and their respective carcass processing tools to enter the defined space.

There may be at least two robotic controllers, one for each robotic arm for controlling and moving the multiple axes of its respective robotic arm. Each robotic controller sends a signal when its respective arm has moved its respective carcass processing tool out of a defined space to indicate that space is clear and to permit one of the other at least two robotic arms to enter the defined space. The signal may include Cartesian coordinate data of the location of the robotic arm.

Each robotic arm may comprise a plurality of links and a plurality of moveable joints connected to the links. The method includes moving the defined space synchronously with a selected carcass in a direction along the line of carcasses, and causing at least one controller to move the plurality of moveable joints on its respective robotic arm to maintain its respective carcass processing tool within the defined space and synchronously with the selected carcass to process the selected carcass. Each robotic arm may be moveably connected to a stationary base. The method includes, after processing the selected carcass in the line of carcasses, causing the at least one controller to move its respective robotic arm along a first axis upstream along the line of carcasses and move the plurality of moveable joints to maintain the carcass processing tool within the defined space and synchronously along the first axis with another selected carcass in the direction along the line of carcasses to process the other selected carcass. The stationary bases of each robotic arm may be disposed side-by-side along a continuously moving line of hogs to be processed. The method includes, after sending the signal from the one robotic controller when its respective arm has moved its respective carcass processing tool out of its respective defined space, causing the other controller to move the other of the at least two robotic arms and its respective carcass processing tool into the defined space.

The carcass may comprise a hog and each carcass processing tool may comprise a splitting saw. Each robotic arm may be moveably connected to a stationary base, the stationary bases may be disposed side-by-side along a continuously moving line of hog carcasses to be processed, each robotic arm may comprise a plurality of links and a plurality of moveable joints connected to the links, and each splitting saw may be extended and retracted from its respective robotic arm. The method includes causing each controller to: a) move the plurality of moveable joints of its respective robotic arm to maintain the splitting saw synchronously along a first axis with a selected carcass in the direction along the line of carcasses being processed; b) simultaneously move the plurality of moveable joints to: i) extend the splitting saw along a second axis to contact the selected hog carcass, ii) move the saw along a third axis in a direction normal to the line of carcasses to make a desired cut on the selected hog carcass, and iii) retract the splitting saw from the selected hog carcass along the second axis after the desired cut is made; and c) after processing the selected hog carcass in the line of carcasses, move its respective robotic arm along the first axis upstream along the line of carcasses to another selected hog carcass and repeat operations (a) and (b) to process the other selected hog carcass, and wherein the defined space of each robotic arm comprises physical space occupied by the respective robotic arm and its respective splitting saw during operations (a) and (b).

In a related aspect the present invention is directed to a robotic controlled carcass processing system comprising at least two robotic arms, each having multiple axes of motion, at least two carcass processing tools, one mounted to each of the robotic arms and a robotic controller for controlling and moving the multiple axes of the at least two robotic arms. The robotic controller determines when one of the at least two robotic arms has moved its respective carcass processing tool out of a defined space to indicate that space is clear and to permit one of the other at least two robotic arms to enter the defined space.

The system may include at least two robotic controllers, one for each robotic arm for controlling and moving the multiple axes of its respective robotic arm. Each robotic controller sends a signal when its respective arm has moved its respective carcass processing tool out of a defined space to indicate that space is clear and to permit one of the other at least two robotic arms to enter the defined space. The signal may include Cartesian coordinate data of the location of the robotic arm.

The system may process carcasses moving along a line, and each robotic arm may comprise a plurality of links and a plurality of moveable joints connected to the links. The defined space moves synchronously with a selected carcass in a direction along the line of carcasses, and at least one controller moves the plurality of moveable joints on its respective robotic arm to maintain its respective carcass processing tool within the defined space and synchronously with the selected carcass to process the selected carcass. Each robotic arm may be moveably connected to a stationary base, and after processing the selected carcass in the line of carcasses, the at least one controller may move its respective robotic arm along a first axis upstream along the line of carcasses and the controller may move the plurality of moveable joints to maintain the carcass processing tool within the defined space and synchronously along the first axis with another selected carcass in the direction along the line of carcasses to process the other selected carcass.

The carcass may comprise a hog and each carcass processing tool may comprise a splitting saw. Each robotic arm may be moveably connected to a stationary base, the stationary bases may be disposed side-by-side along a continuously moving line of hog carcasses to be processed, each robotic arm may comprise a plurality of links and a plurality of moveable joints connected to the links, and each splitting saw may be extended and retracted from its respective robotic arm. Each controller: a) moves the plurality of moveable joints of its respective robotic arm to maintain the splitting saw synchronously along a first axis with a selected carcass in the direction along the line of carcasses being processed; b) simultaneously moves the plurality of moveable joints to: i) extend the splitting saw along a second axis to contact the selected hog carcass, ii) move the saw along a third axis in a direction normal to the line of carcasses to make a desired cut on the selected hog carcass, and iii) retract the splitting saw from the selected hog carcass along the second axis after the desired cut is made; and c) after processing the selected hog carcass in the line of carcasses, moves its respective robotic arm along the first axis upstream along the line of carcasses to another selected hog carcass and repeats operations (a) and (b) to process the other selected hog carcass, and wherein the defined space of each robotic arm comprises physical space occupied by the respective robotic arm and its respective splitting saw during operations (a) and (b).

A further aspect of the present invention is directed to a method of processing a suspended carcass as the carcass is moved along a defined path comprising providing a carcass rail having a plurality of trolleys movable along the rail, each trolley capable of supporting an animal carcass, providing a carcass processing device capable of effecting a processing operation on a carcass supported by a trolley moving along the carcass rail, providing a controller in communication with the carcass rail and the carcass processing device, and providing an identification to a desired supported carcass on the carcass rail prior to the carcass passing a processing device to signify a condition of the carcass that requires special handling of the carcass. The method includes moving a plurality of supported carcasses on the carcass rail past the carcass processing device, using the carcass processing device, effecting a standard processing operation on each of the carcasses as the carcasses pass the carcass processing device, and identifying to the controller the carcass having the identification. The method then includes sending a signal from the controller to the carcass processing device to change the standard processing operation effected on the carcass having the identification and effect a different operation from the standard processing operation as the carcass having the mark passes the carcass processing device.

The controller signal to the carcass processing device may comprise a signal synchronized with the carcass processing device and the movement of carcasses along the carcass rail. The signal may include a register containing data on the carcass having the identification.

The method may include providing a sensor capable of detecting a mark on a supported carcass. The method may further include providing the identification to a desired supported carcass on the carcass rail by placing a mark on the desired supported carcass on the carcass rail prior to the carcass passing the processing device to signify a condition of the carcass that requires special handling of the carcass, identifying with the sensor the carcass having the mark, and sending a signal from the sensor to the controller. The method then includes sending a signal from the controller to the carcass processing device to change the standard processing operation effected on the carcass having the mark and effect a different operation from the standard processing operation as the carcass having the mark passes the carcass processing device.

The carcass may be a hog carcass, the mark may be a tag placed on the hog carcass, the carcass processing device may include a splitting saw, the standard processing operation may be splitting the carcass, the sensor may include a vision system to detect the mark tag and the different operation may be not splitting the hog carcass having the mark.

The method may include providing a switch to identify position of a desired supported carcass among the plurality of supported carcasses on the carcass rail, and may further include providing the identification to a desired supported carcass on the carcass rail by engaging the switch to identify the desired supported carcass on the carcass rail prior to the carcass passing the processing device to signify a condition of the carcass that requires special handling of the carcass.

Yet another aspect of the present invention is directed to a method of processing a suspended carcass as the carcass is moved along a defined path comprising providing a carcass rail having a plurality of trolleys spaced at desired intervals and movable along the rail, each trolley capable of supporting an animal carcass, providing a carcass processing device capable of effecting a processing operation on a carcass supported by a trolley moving along the carcass rail, providing a sensor capable of detecting absence of a carcass at the desired interval on the rail, and providing a controller in communication with the carcass rail, the carcass processing device and the sensor. The method includes moving a plurality of supported carcasses on the carcass rail past the carcass processing device, using the carcass processing device, effecting a standard processing operation on each of the carcasses at the desired interval as the carcasses pass the carcass processing device, identifying with the sensor the absence of a carcass at the desired interval on the rail, and sending a signal from the sensor to the controller. The method then includes, using the controller, recording location of the interval of the rail having no carcass, and sending a signal from the controller to the carcass processing device to change the standard processing operation at the interval of the rail having no carcass.

The controller signal to the carcass processing device may comprise a signal synchronized with the carcass processing device and the movement of carcasses along the carcass rail. The signal may include a register containing data on the absence of the carcass to be processed by the carcass processing device.

The method may further include providing downstream on the carcass rail another carcass processing device capable of effecting a processing operation on a carcass supported by a trolley moving along the carcass rail. The method includes, using the controller, sending the location of the interval of the rail having no carcass to the other carcass processing device and changing the standard processing operation of the other carcass processing device at the interval of the rail having no carcass.

The carcass may be a hog carcass, the carcass processing device may include a splitting saw, the standard processing operation may be splitting the carcass, the sensor may include a vision system to detect the absence of a carcass at the desired interval on the rail, and the change in the standard processing operation may be to effect no processing operation at the interval on the rail having no carcass.

In a further aspect the present invention provides a method of processing a suspended carcass as the carcass is moved along a defined path comprising providing a carcass rail having a plurality of trolleys spaced at desired intervals and movable along the rail, each trolley capable of supporting an animal carcass, providing first and second carcass processing devices each capable of effecting a processing operation on a carcass supported by a trolley moving along the carcass rail, the carcass rail passing a trolley sequentially past the first carcass processing device and the second carcass processing device, providing a sensor capable of detecting location of a supported carcass on the carcass rail, and providing a controller in communication with the carcass rail, and the first and second carcass processing devices. The method includes moving a plurality of supported carcasses on the carcass rail past the first and second carcass processing devices, identifying with the sensor the location of a carcass on the carcass rail, and sending a signal from the sensor to the controller with the location of the carcass. The method then includes sending a signal from the controller to the first carcass processing device to effecting a standard processing operation on the carcass identified by the sensor as the identified carcasses passes the carcass processing device, and, using the controller, causing the second carcass processing device to effect no processing operation on the carcass identified by the sensor as the identified carcasses passes the carcass processing device.

The controller signal to the first carcass processing device may comprise a signal synchronized with the carcass processing device and the movement of carcasses along the carcass rail. The signal may include a register containing data on processing previously performed on the carcass to be processed by the first carcass processing device.

The method may further include identifying with the sensor the location of another carcass on the carcass rail, sending a signal from the sensor to the controller with the location of the other carcass, and, using the controller, causing the first carcass processing device to effect no processing operation on the other carcass identified by the sensor as the other identified carcasses passes the carcass processing device. The method includes sending a signal from the controller to the second carcass processing device to effecting a standard processing operation on the other carcass identified by the sensor as the other identified carcasses passes the carcass processing device. The carcass may be a hog carcass, the carcass processing device may include a splitting saw and the standard processing operation may be splitting the carcass.

The present invention is also directed to a method of processing a suspended carcass as the carcass is moved along a defined path comprising providing a carcass rail having a plurality of trolleys spaced at desired intervals and movable along the rail, each trolley capable of supporting an animal carcass, providing first and second carcass processing devices each capable of effecting a standard processing operation on a carcass supported by a trolley moving along the carcass rail, the carcass rail passing a trolley sequentially past the first carcass processing device and the second carcass processing device, and providing a controller in communication with the carcass rail, and the first and second carcass processing devices. The method includes moving a plurality of supported carcasses on the carcass rail, identifying a location along the carcass rail to signify the absence of a supported carcass or the presence of a supported carcass that requires special handling, sending a signal to the controller with the location along the carcass rail, moving a plurality of carcasses supported on the trolleys on the carcass rail sequentially past the first carcass processing device and then past the second carcass processing device, and sending a signal from the controller to the first carcass processing device and to the second carcass processing device to either effect a standard processing operation or to modify the standard processing operation as the trolley at the identified location passes the carcass processing devices.

The controller signal to the carcass processing devices may comprise a signal synchronized with the carcass processing devices and the movement of carcasses along the carcass rail. The signal may include a register containing data on processing previously performed on the carcass to be processed by the respective carcass processing device.

The method may include providing a sensor capable of detecting a mark on a supported carcass, and may further include providing the identification to the location along the carcass rail by placing a mark on a desired supported carcass on the carcass rail prior to the carcass passing the first and second processing devices to signify a condition of the carcass that requires special handling of the carcass, identifying with the sensor the carcass having the mark, sending a signal from the sensor to the controller, and sending a signal from the controller to the first and second carcass processing devices to effect no operation on the carcass having the mark as the carcass having the mark passes the carcass processing devices.

The method may include providing a sensor capable of detecting absence of a carcass at the desired interval on the rail, and may further include providing the identification to the location along the carcass rail by identifying with the sensor the absence of a carcass at the desired interval on the rail prior to the carcass passing the first and second processing devices, sending a signal from the sensor to the controller, and sending a signal from the controller to the first and second carcass processing devices to effect no operation at the interval of the rail having no carcass.

The method may include providing a sensor capable of detecting location of a supported carcass on the carcass rail, providing the identification to the location along the carcass rail by identifying with the sensor the location of a supported carcass, and sending a signal from the sensor to the controller with the location of the carcass. The method then includes sending a signal from the controller to the first carcass processing device to effecting a standard processing operation on the carcass identified by the sensor as the identified carcass passes the carcass processing device, and sending a signal from the controller to the second carcass processing device to effect no processing operation on the carcass identified by the sensor as the identified carcass passes the carcass processing device.

The present invention is further directed to a method of processing a suspended carcass as the carcass is moved along a defined path comprising providing a carcass rail having a plurality of trolleys spaced at desired intervals and movable along the rail, each trolley capable of supporting an animal carcass, providing a carcass processing device having a splitting saw capable of effecting a splitting operation on a carcass supported by a trolley moving along the carcass rail, providing a sensor for measuring a size parameter of each carcass moving along the carcass rail, and providing a controller in communication with the carcass rail, the carcass processing device and the sensor. The method includes moving a plurality of supported carcasses on the carcass rail, measuring a size parameter of each carcass as it moves along the carcass rail, sending a signal to the controller with the size parameter of each carcass, using the size parameter, having the controller determine distance to be traveled by the carcass splitting saw to split a desired one of the carcasses, and sending a signal from the controller to the carcass processing device to move the carcass splitting saw the determined distance to split the desired one of the carcasses.

The controller signal to the carcass processing device may comprise a signal synchronized with the carcass processing device and the movement of carcasses along the carcass rail. The signal may include a register containing data on the size parameter of the carcass to be processed by the carcass processing device.

The sensor may be capable of detecting weight of each carcass. The method further includes measuring weight of each carcass as it moves along the carcass rail, sending a signal to the controller with the weight of each carcass, using the carcass weight, having the controller determine distance to be traveled by the carcass splitting saw to split a desired one of the carcasses, and sending a signal from the controller to the carcass processing device to move the carcass splitting saw the determined distance to split the desired one of the carcasses. The carcass may be a hog carcass having a backbone and a back strap adjacent the backbone, the splitting operation may be the splitting of the backbone, and the distance determined may be the distance of the splitting saw to be traveled to split the backbone completely without splitting the entire back strap of the hog carcass.

The sensor may be capable of detecting length of each carcass. The method further includes measuring length of each carcass as it moves along the carcass rail, sending a signal to the controller with the length of each carcass, using the carcass length, having the controller determine distance to be traveled by the carcass splitting saw to split a desired one of the carcasses, and sending a signal from the controller to the carcass processing device to move the carcass splitting saw the determined distance to split the desired one of the carcasses. The carcass may be a hog carcass having a backbone and a severed head hanging by a pair of jowls with one jowl on each side of the carcass, the splitting operation may be the splitting of the backbone, and the distance determined may be the distance of the splitting saw to be traveled to split the backbone completely without cutting into the severed head of the hog carcass.

The present invention is also directed to system(s) for processing a suspended carcass as the carcass is moved along a defined path, with the system(s) incorporating one or more carcass processing devices, back stations, sensors and/or controllers having the functions and capabilities described above.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the embodiment(s) of the present invention, reference will be made herein to FIGS. 1-18 of the drawings in which like numerals refer to like features of the invention.

Figure 1:
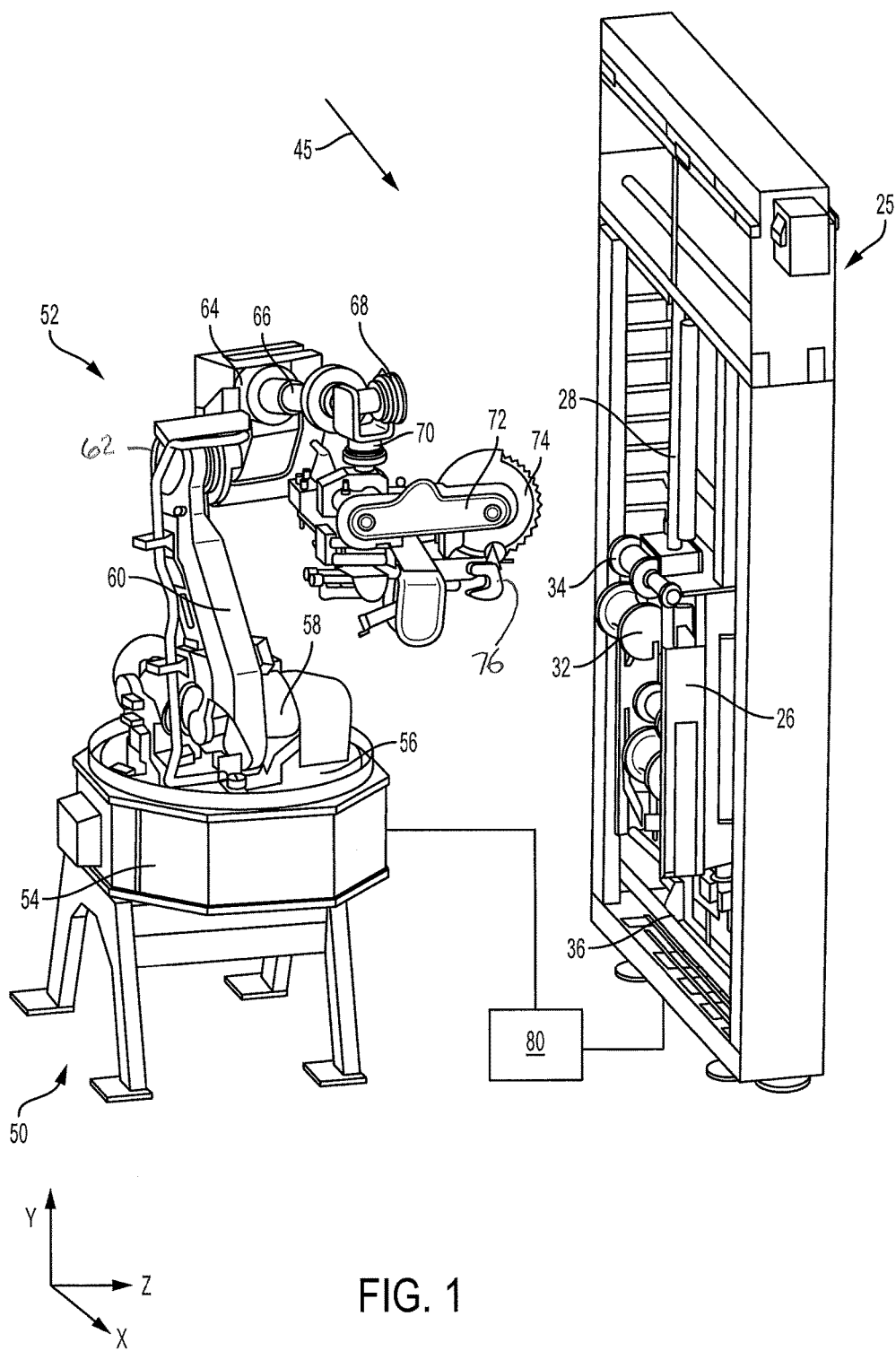
FIG. 1 is a perspective view of a processing station embodiment of the present invention in which a robot station having a carcass splitting saw on a robotic arm is positioned opposite a back station for supporting the back of the carcass.
Figure 2:
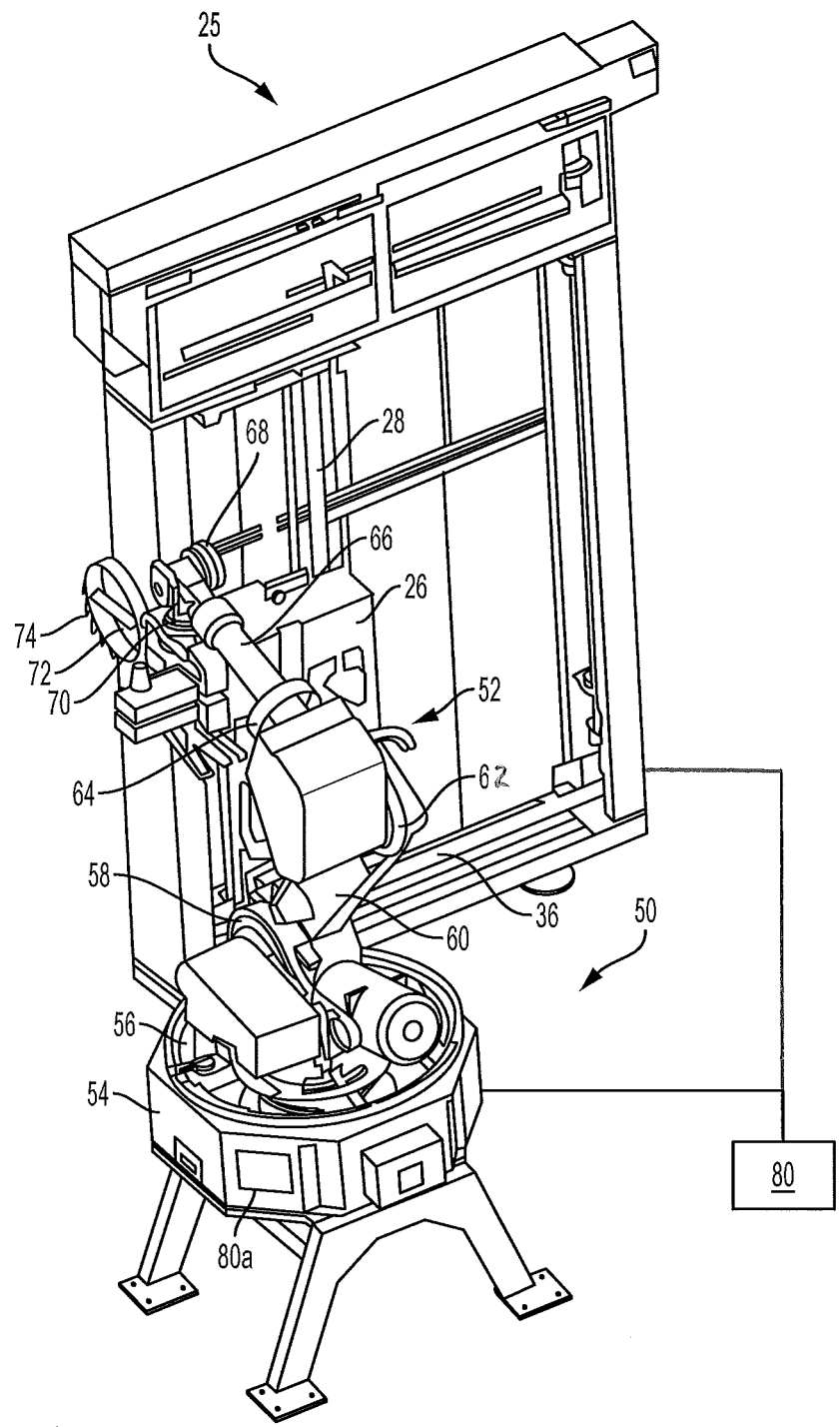
FIG. 2 is another perspective view of the processing station of FIG. 1, showing the back of the robot station and the front of the back station.
Figure 3:
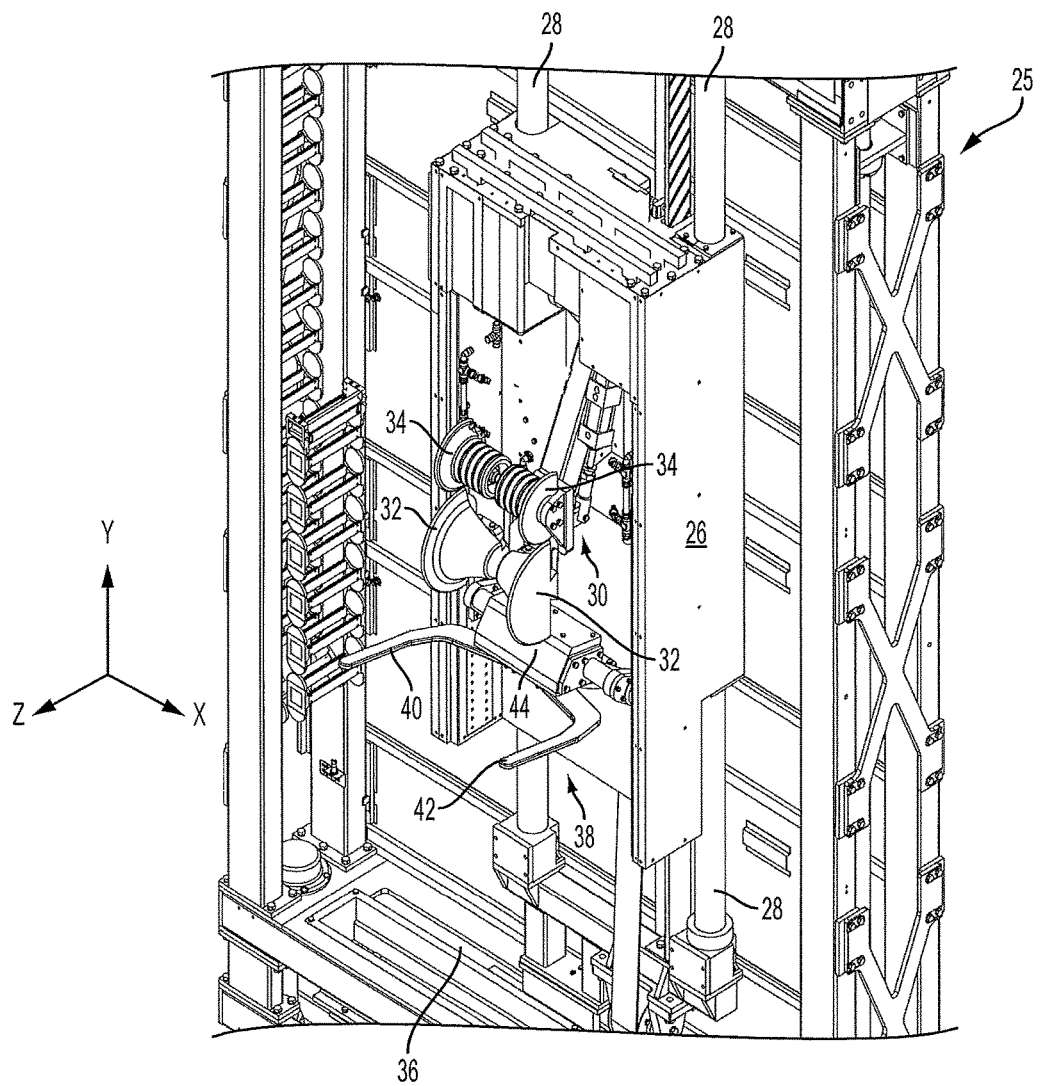
FIG. 3 is a perspective view a portion of the back station of FIG. 1.

Robot station 50 as depicted in the drawing figures, beginning with FIG. 1, is the processing station used to process the carcasses individually and sequentially as they pass by suspended along carcass rail 90. The invention also permits the use of two or more robot stations, 50a, 50b, as shown in FIGS. 13-18 and as discussed in more detail below. An articulating robotic arm 52 is mounted on each robot station capable of effecting smooth and continuous movement of one or more hog processing tools or devices, such as saw arm 72, saw 74 and front guide roller 76. The robot station includes a base 54 set on four legs and mounted in a stationary position along the rail. On the base is a turntable joint 56 able to swing the robotic arm 52 mounted thereon around a vertical axis to various angular positions. Lower joint 58 mounted on turntable 58 is at the lower end of lower arm segment or link 60 and rotates link 60 about a horizontal axis. At the upper end of link 60 is an upper joint 62 able to rotate upper arm segment or link 66 about a horizontal axis. Between link 66 and the proximate end of upper joint 62 is roll joint 64 able to rotate link 66 about its longitudinal axis. A bend joint 68 at the distal end of link 66 is able to rotate saw arm 72, saw 74 and front guide roller 76 about an axis normal or perpendicular to the longitudinal axis of link 66. Twist joint 70 is disposed between bend joint 68 and saw arm 72, and rotates the saw arm about an axis normal to the axis of rotation of bend joint 68.

The robotic arm 52 of the system is able to process the hog carcass while it is suspended and moving on a conveyor by cutting it with a saw mounted on the end of the arm. The conveyor 90 is positioned between the robotic arm 52 carrying the carcass-processing device, e.g., the saw, and the carcass back support on the back station 25. The Cartesian coordinate space in the vicinity of the carcass, robotic arm and back support is defined by the X-, Y- and Z-axes as shown in FIG. 1 and other drawing figures. The term "extend" or "extension" unless otherwise specified means to move generally in the Z-direction toward the conveyor and/or the carcass hanging, while the term "retract" or "retraction" unless otherwise specified means to move in the Z-direction generally away from the conveyor and/or carcass. All movement of the components described herein are controlled by the controller 80, either on the individual robot station or remotely located and linked by wire or wirelessly to one or more robot stations, and are effected using conventional actuators, drivers, motors, sensors and the like, unless otherwise specified.

The robotic arm 52 may have a circular saw or band saw attached for splitting a carcass, or may have any other type of meat or carcass processing tool attached. The robotic controller drives the arm and provides multiple axis, inverse kinematic and interpolation for moving the carcass processing tool in Cartesian coordinate space by controlling the multiple axes of the robotic arm. The robotic controller also provides multiple axis interpolation control for linear axes to drive a separate back support for the carcass in synchronized motion so that the carcass rail, processing tool, carcass and back support all can be moved synchronously. The controller(s) employed in the present invention are described further below.

When cutting or otherwise processing certain animal carcasses, such as hog carcasses, it is useful to provide a back support to have the carcass supported on the side opposite the carcass processing tool, so that the forces of the carcass processing tool do not move the carcass out of a known position during the processing, particularly cutting a backbone or spine. In some other carcasses, such as beef carcasses from cows or other cattle in which the carcasses may be split by a band saw, a back support may not be needed because of the mass of the carcass. The operation of the individual back support station may be the same as that described for the back station in the instant applicant's U.S. Pat. No. 6,126,536 entitled "Automated Saw for Splitting Carcasses" issued on Oct. 3, 2000 and/or published PCT application WO 2014/036547 A1 entitled "Carcass Stabilizer" published on Mar. 6, 2014, the disclosures of which are hereby incorporated by reference.

FIGS. 1-11 show in various aspects the carcass back support or back station 25, a robot station 50 having a robotic arm assembly 52, which will be referred to as being on the front side, and carcass 20 moving in direction 45 between the robotic arm and the back station. Each robotic arm 52 also includes at its distal end a carriage having saw arm 72 which carries a rotatable circular splitting saw 74 and, below the saw, a set of two front guide rollers 76 that may be extended into the eviscerated carcass to guide along the spine during splitting of the carcass by sawing the spine in two halves vertically. The plane of the saw 74 blade during cutting of the carcass is perpendicular to the direction of carcass movement 45 on carcass rail 90.

Figure 10:
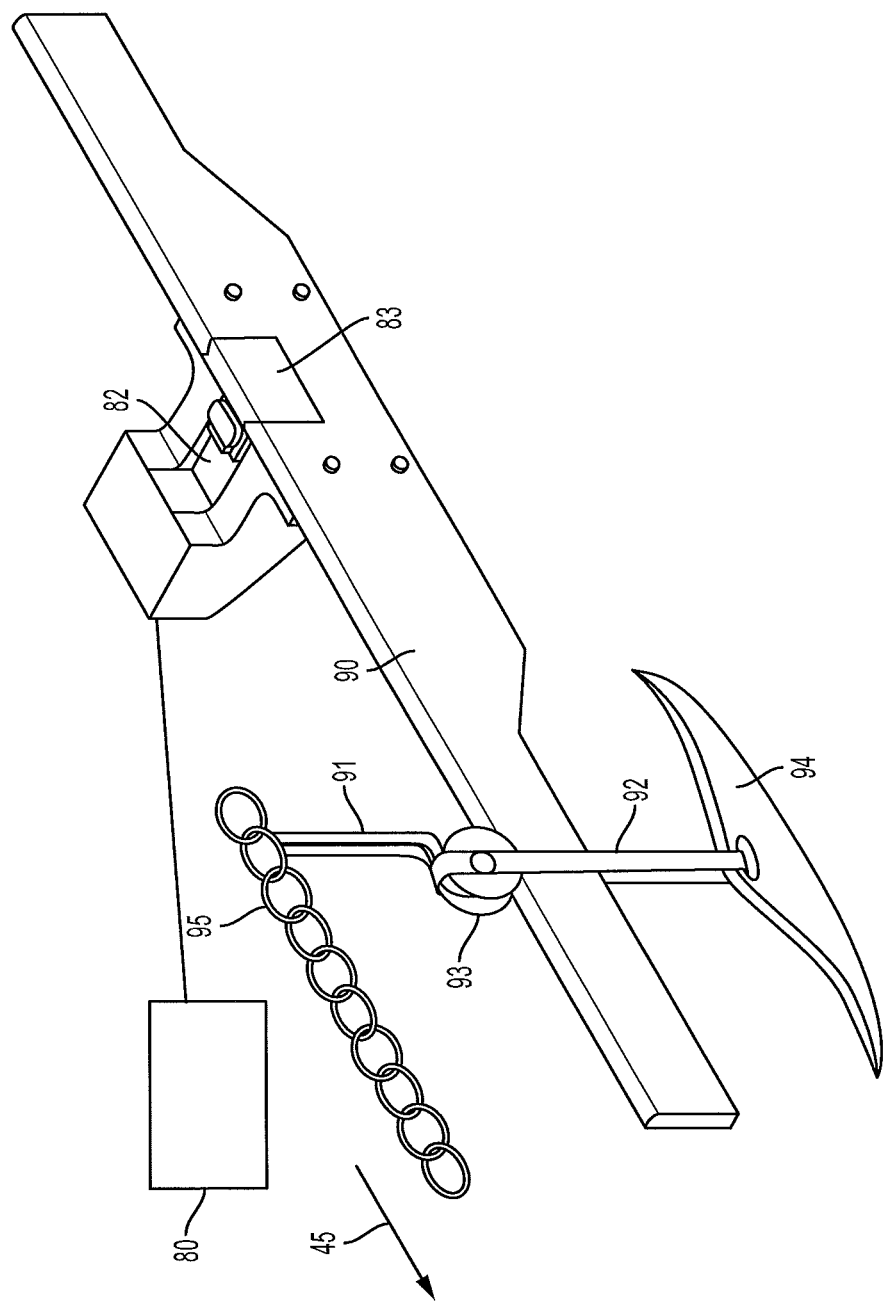
FIG. 10 is a perspective view of a portion of the carcass rail and a trolley, and showing a scale for measuring mass of an individual carcass on a trolley.

The construction of an embodiment of the carcass-supporting trolley is shown in FIG. 10, where trolley 92 may ride on a wheel 93 rolling along the upper edge of carcass rail 90. Attached to the lower end of the trolley is gambrel 94, which comprises a horizontally extending rack with sharpened ends on which the carcass hind feet are attached. Trolley 92 and the suspended carcass are moved along by force of a pusher member 91 which bears against the upper end of the trolley, and which is itself moved by a conveyor drive chain 95 operating at the desired speed of processing of the carcasses.

Figure 9:
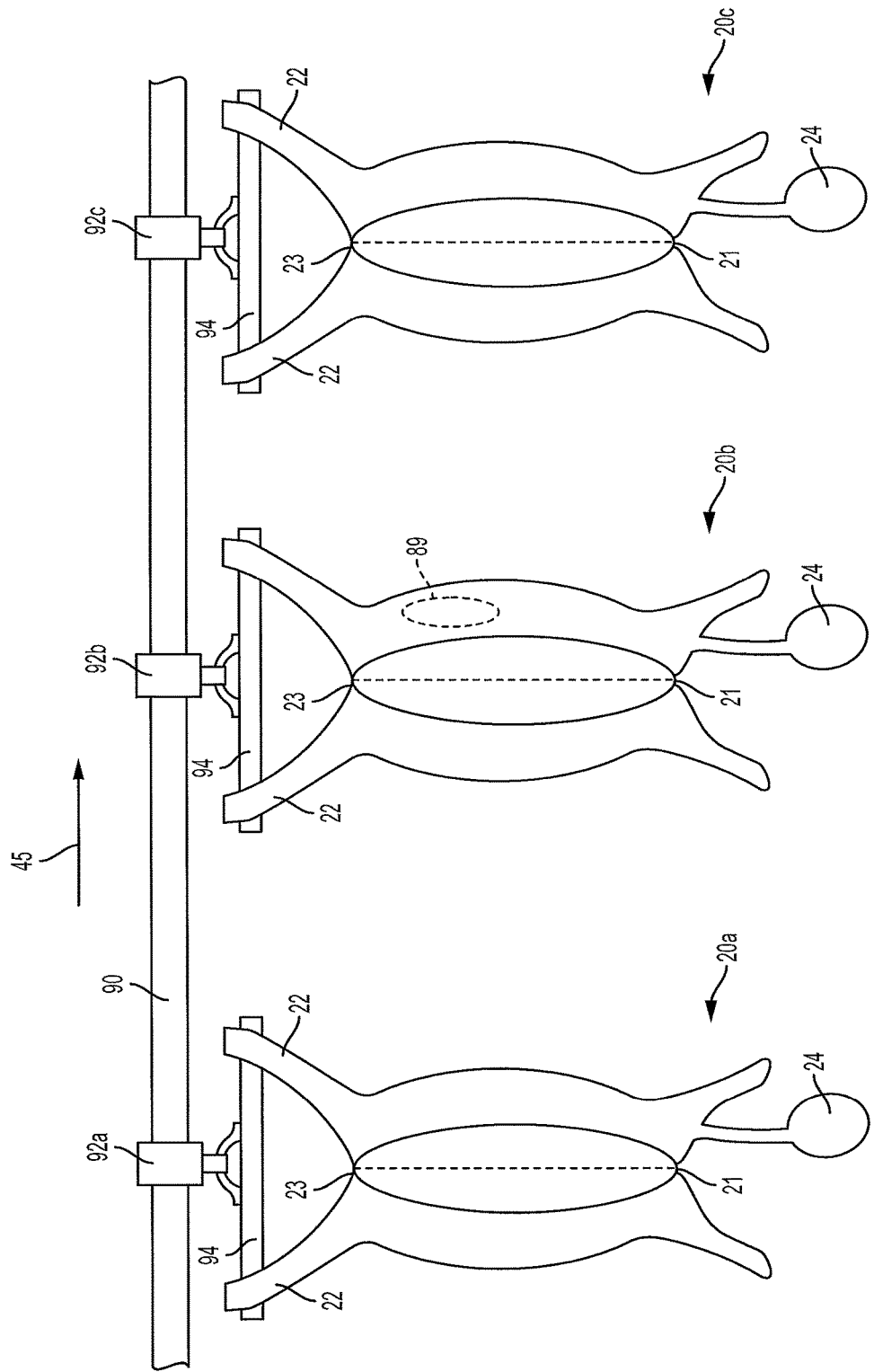
FIG. 9 is a front elevational view of a series of hog carcasses supported by trolleys on a carcass rail, to be processed by a processing station of the present invention.

Suspended carcasses 20a, 20b, 20c to be split are shown in more detail in FIG. 9 individually hanging by hind feet 22 from gambrel 94 of trolleys 92, 92b, 92c, respectively. The backbone or spine is shown in dotted line extending from the atlas joint 21 at the base of the severed head (shown attached and hanging by only one jowl on one side of the carcass) to the base of the spine or backbone 23, at the upper end of the carcass.

During the splitting operation, the exterior portion along the carcass backbone is supported against the extension of saw 74 and guide rollers 76 by back rollers 30, which are mounted on back carriage 26. Back carriage 26 is itself mounted to and slideable along a pair of vertical guide rails 28, to follow the saw as it makes its vertical cut, and upper and lower guide tracks 36, to follow the carcass as it continuously moves horizontally along the carcass rail 60 during the splitting operation. The back rollers can be extended outward from the back carriage 26 towards the saw and into contact with the back of the carcass. The front guide rollers 28 extend outward from the robotic arm towards the back station and into contact with the spine during the splitting operation, which generally starts at the top portion of the spine at base 23 and moves downward to joint 21. The guide rollers may be extended to contact the backbone prior to the extension and start of the splitting operation by saw 74. The guide rollers may or may not extend independently of the saw.

The robot station base 54 and back station 25 are stationary, and rail 90 carries the hog carcasses between the two as they move continuously in direction 45. In the starting position saw 74 on the end of robotic arm 52 and carriage 26 on back station 25 are initially located vertically near their uppermost positions and horizontally close to the point where the carcasses first enter (toward carcasses 20a and 20b in FIG. 5). The back roller 30 on back station 25 is extended outward from the carriage 26, and guide rollers 76 on the robotic arm 52 extend outward from the robotic arm on robot station 50. This traps the spine of the carcass at a known location relative to the saw and back support, and will result in an accurate grasping and positioning of the carcass according to the location of the spine.

Figure 4:
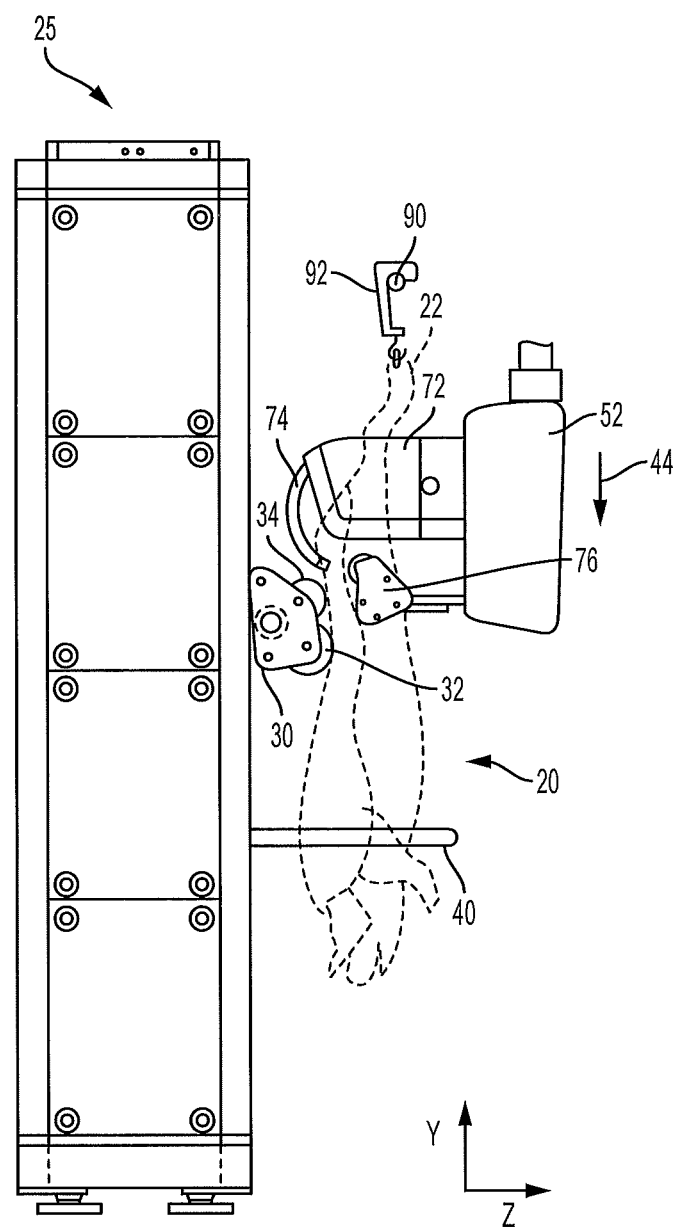
FIG. 4 is a side elevational view of portion of the processing station of FIG. 1, showing the end of the robotic arm during processing of a hog carcass being supported on the back station.

To contain any carcass swinging from the trolley, particularly if it is moving forward and back along the direction of the carcass rail, and/or if the attached head of the carcass is pendulum swinging due to prior stopping and starting of the carcass line, the back carriage 26 and the back roller assembly 30 include lower guide 32 and upper guides and rollers 34. These back rollers/guides are extendable outward to move into contact with the back of the carcass. The carcass stabilizer 38 includes a pair of arms 40, 42 which are geared together to swing in an open and closed—pincer-like motion. Before the carcass to be processed is in position in front of the back carriage, arms 40, 42 are pivoted or rotated upward and out of the way. When the carcass arrives at the back carriage, arms 40, 42 rotate downward (FIG. 3) and close towards each other to grasp the lower portion of the carcass near the shoulders (FIG. 4).

Figure 5:
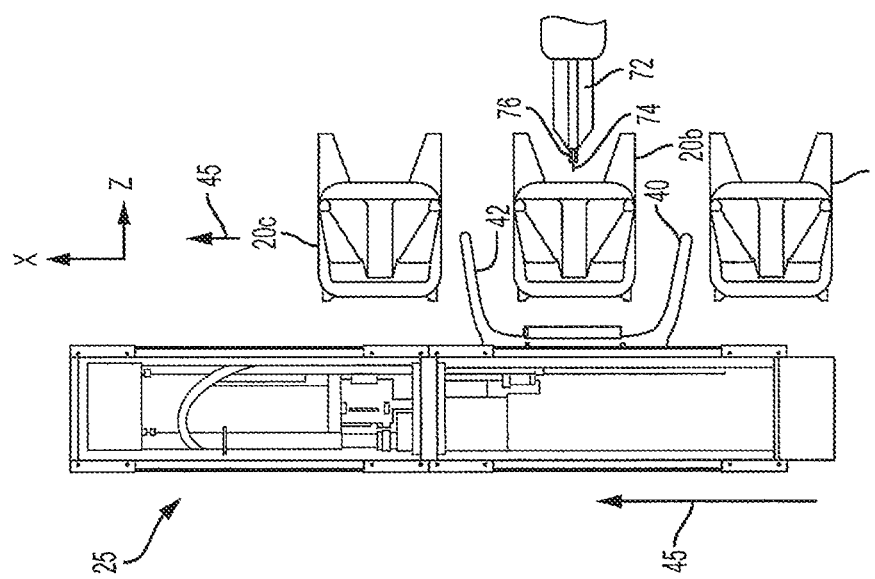

In FIG. 5, carcass 20b has just entered the work area. Carcass 20c has just been split and carcass 20a is just outside the work area. All three carcasses are continuously moving in direction 45. In a typical processing operation, carcass 20b will only be within the operating area of the machine for three seconds. During that time, the stabilizer must stabilize the carcass, the front and back rollers must extend to find the top of the carcass, the saw and rollers must drive to the bottom end of the carcass to split the carcass, the stabilizing arms, saw and front/back roller must all retract and all must return from the bottom position at the exit of the machine to the top position at the front of the machine ready for the next carcass.

Figure 6:
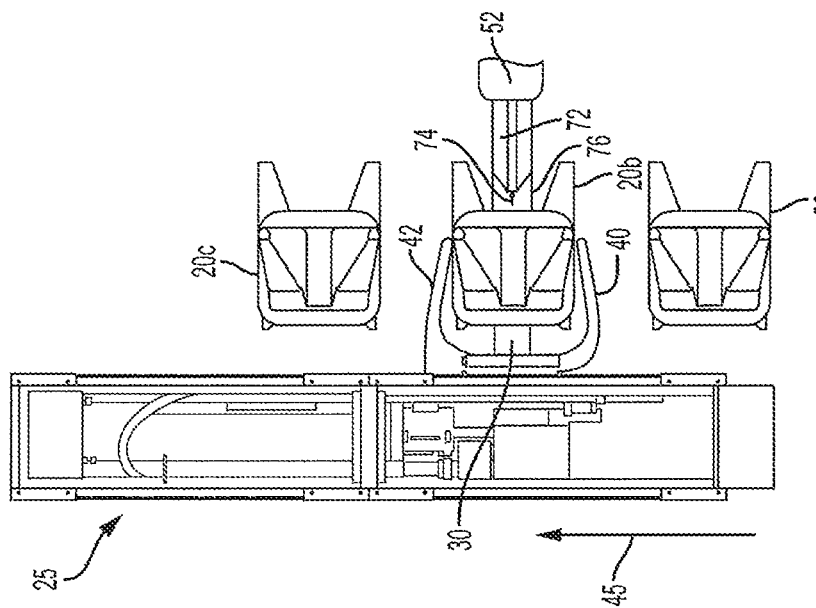
FIGS. 5-8 are top plan views of the processing station of FIG. 1, showing the end of the robotic arm and the back station, and showing the sequence of movement of the robotic arm and saw, and back station during processing of a plurality of hog carcasses in an assembly line.

As can be seen in FIG. 5, arms 40, 42 are opened and rotated into position such that the distance between the arms corresponds to the maximum spacing between two carcasses minus the average width of a single carcass. In other words, arms 40, 42 will be open to the maximum extent permitted by the spacing between the carcasses. For a common spacing in a carcass processing facility, the carcass spacing is about 24 in. (600 mm) and the width of each carcass is about 18 in. (450 mm), leaving a typical space between the carcasses of about 6 in. (150 mm). As the carcass is moving along the rail, as shown in FIG. 6, arms 40, 42 close and grasp carcass 20b to ensure that the carcass is no longer swinging to place it into an accurate centerline position, and saw 74 begins to cut the backbone. By comparison between FIGS. 5 and 6 it can be seen that in FIG. 5, the front roller assembly 76 has not yet been extended, whereas in FIG. 6 the back roller assembly 30 and optionally the front roller assembly 76 have been extended to grasp the spine of the carcass 20b. (See also FIG. 4.) As saw 74 begins its vertically downward cut stroke, the back rollers and the entire back carriage 26 with arms 40, 42 move vertically down along guides 28 in the Y-direction 44 (FIG. 4), towards the floor of the processing facility. Simultaneously, the saw 74 at the end of the robotic arm 52 and back carriage 26 move horizontally along guide track 36 in the X-direction 45 at the same speed as carcass 20b along rail 90.

Figure 8:
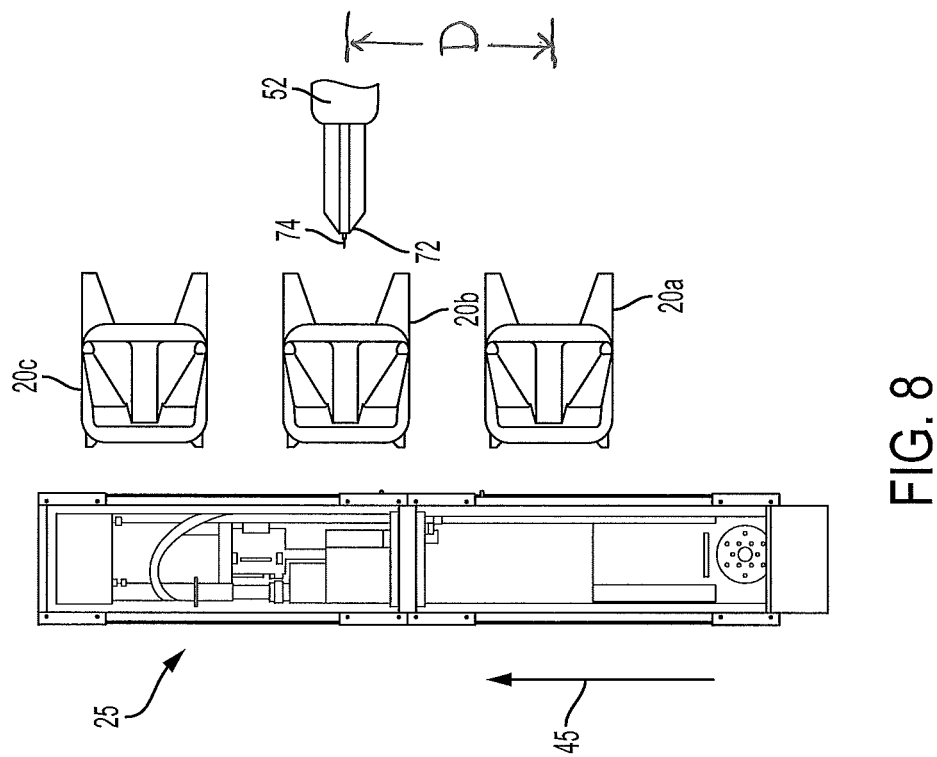
Figure 7:
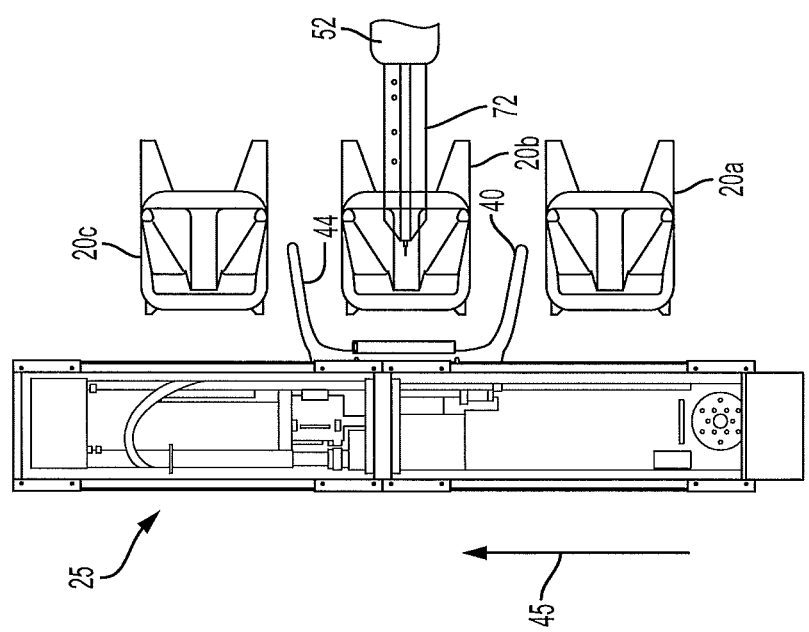

Referring to FIG. 7, when the backbone has been fully split and the saw/back carriage motion downward has been completed, the arms 40, 42 are opened while saw 74 is still fully extended. Subsequently, in FIG. 8 the arms are pivoted upward and the saw and front rollers are retracted. Following the retraction of saw 74 by robotic arm 52 and the retraction of back rollers 30 into the back station 25, the robotic arm 52 with saw 74 and back carriage 26 will drive horizontally opposite direction 45 and upward into the starting position to engage carcass 20a, and the operation will be repeated. During the sequence, saw 74 and back carriage 26 move a horizontal (X-axis) distance D as indicated in FIG. 8.

In one aspect, the back support on back station 25 may be a linear axis driven set of rollers that supports the back of the carcass as the carcass moves along the carcass rail. The drivers for the rollers are controlled by controller 80 (FIG. 1). The linear axes allow the robotic controller to move the back support rollers horizontally in the X-direction with the motion of the carcass rail, vertically in the Y-direction in synchronism with the processing tool, and retracted in and extended out in the Z-direction to engage and support the back of the carcass.

The controller(s) of the present invention employ inverse kinematics to determine the position in Cartesian space of the robotic arm and tracking of the saw during the entire cut sequence, initially as the saw extends toward the carcass in the Z-direction, then as the backbone cut is made from the top of the carcass down to the bottom in the Y-direction, and finally as the saw retracts away from the carcass in the Z-direction. All saw movements occur as the saw follows the carcass moving in the X-direction horizontally on the carcass rail. Each robotic arm is made up of rigid segments or links connected by joints. The desired extension, end movement of the saw vertically downward along the backbone and retraction while simultaneously moving horizontally to keep up with the carcass travel velocity along the rail requires the computation of the dynamic change of the robotic arm joint angles to maintain the desired saw position. Successful implementation of such joint motion control also requires that the link and joint elements of the robotic arm move within their permissible physical limits. The controller may employ any known method of modeling and solving such inverse kinematics problems.

The inverse kinematic control provided by the robotic controller allows multiple axes of the robotic arm to move the processing tool in Cartesian space (X, Y, Z axes). The simultaneous interpolation control of both the robotic arm 52 (on the belly side of the carcass) and the back rollers 32, 34 ensures that the two sides of the system can be moved synchronously with the motion of the carcass along the rail during the entire processing operation.

As shown in the example herein, the robotic arm 52 has six (6) axes of control for the arm and a seventh axis for controlling a circular saw motor, when the invention is implemented in a carcass splitting system. The six robotic arm axes in the drawings are the rotary axes S (swing joint 56), L (lower joint 58), U (upper joint 62), R (roll joint 64), B (bend joint 68) and T (twist joint 70). The motion of these robotic arm axes are then converted into Cartesian coordinates through the inverse kinematic motion algorithms by the processor in the controller(s). These Cartesian coordinates are expressed as directional axes for the robotic arm, Xp, Yp and Zp, and rotational axes for the robotic arm Ap (roll), which revolves around the X-axis), Bp (pitch), which revolves around the Y-axis and Cp (yaw), which revolves around the Z-axis. The back support roller side may have three (3) axes. These Cartesian coordinates are expressed as directional axes for the back support axes, Xb and Yb, and a rotational axis for the back support Ab (roll), which revolves around the X-axis. The result is that the invention may use at least a ten (10) axis controller. Of the ten robotically controlled axes, at least six (the S, L, U, R, B and T axes for the robotic arm) provide inverse kinematic control, and three are linear axes (the back support). The robotic controller ensures that all are interpolated to be in the correct relative positions as processing occurs.

During the sequence of carcass splitting as described above and shown in FIGS. 5-8, the controller therefore employs inverse kinematic control to move all of the robot joints, including turntable joint 56, lower joint 58, upper joint 62, roll joint 64, bend joint 68 and twist joint 70, while maintaining saw 74 and front roller 76 in a constant vertical orientation and maintaining the plane of saw blade 74 perpendicular to the direction of carcass movement 45 as the saw and front roller extend to make contact with the carcass backbone, move downward to split the backbone, retract from the carcass and begin the sequence again, all while moving horizontally with the carcass and then reversing horizontal movement for the subsequent carcass.

Prior to splitting the carcass backbone, processing is performed on the hog carcass to cut the body open to remove internal organs and to sever the head. Subsequently, the carcass backbone is split. The length and depth of cut may be determined and controlled in accordance with the present invention by determining a size parameter of the carcass, e.g., carcass mass (weight) or carcass length, prior to the splitting operation, depending on whether U.S. or European style carcass processing is employed prior to the splitting operation.

A common method of processing hog carcasses in the U.S. severs the head 24 from the atlas joint 21, leaving the head attached by one jowl to one side only of the carcass, as shown in FIG. 9. To prevent the carcass from becoming unbalanced by the mass of the head hanging from only one side, it is therefore desirable to leave the two halves of carcass attached by the skin and flesh at the shoulders after splitting the backbone. This skin and flesh adjacent the exterior of the backbone, on the side of the carcass opposite that approached by the splitting saw 74, is referred to as the back strap of the carcass. Maintaining a portion of this connecting back strap after splitting the backbone allows the carcasses to stay balanced so that the feet 22 do not slip off the trolley, despite the unbalanced mass of the head 24. To avoid cutting through the entire back strap, while still severing completely all of the feather bones of the backbone, the present invention measures the mass or weight of each carcass, and determines the depth and/or length of the cut made by the saw 74. The cut depth and/or length may be determined by analysis of a group of hog carcasses to correlate carcass weight with the amount of back strap remaining after a cut of a particular depth and/or length through the backbone. Using such analysis, an estimate of the depth of back strap present is made and the controller is able to send the proper signal to effect a particular desired depth of movement of saw 74 stroke in the Z-direction and the length of the saw 74 stroke in the Y-direction.

The mass or weight of each carcass may be determined by removing a section of carcass conveyor rail 90 and replacing it with a size detection rail section that includes a weight transducer or scale. A transducer on the rail feeds weight information back to the controller as the trolley rolls over the transducer. As shown in FIG. 10, there is provided on carcass rail 90, upstream with respect to carcass motion and prior to the carcass processing device(s), a transducer 82 that is physically connected to an actuator 83. Actuator 83 is located along the upper edge of rail 90 so that when trolley wheel 93 passes over it, the weight of the carcass is measured by transducer 82, which sends a signal with the weight data to controller 80 (the weight of the portions of trolley 92 being subtracted to arrive at the carcass weight). This data is collected in real-time by the controller so that it may be used to adjust the depth and length of cut by the robot station on a carcass-by-carcass basis. Controller 80 tracks the relative position of the carcass as it passes down the carcass rail and processes the weight data as required to direct the depth and length of cut by saw 74 as that measured hog carcass is processed at robot station 50 downstream of the scale.

Figure 11:
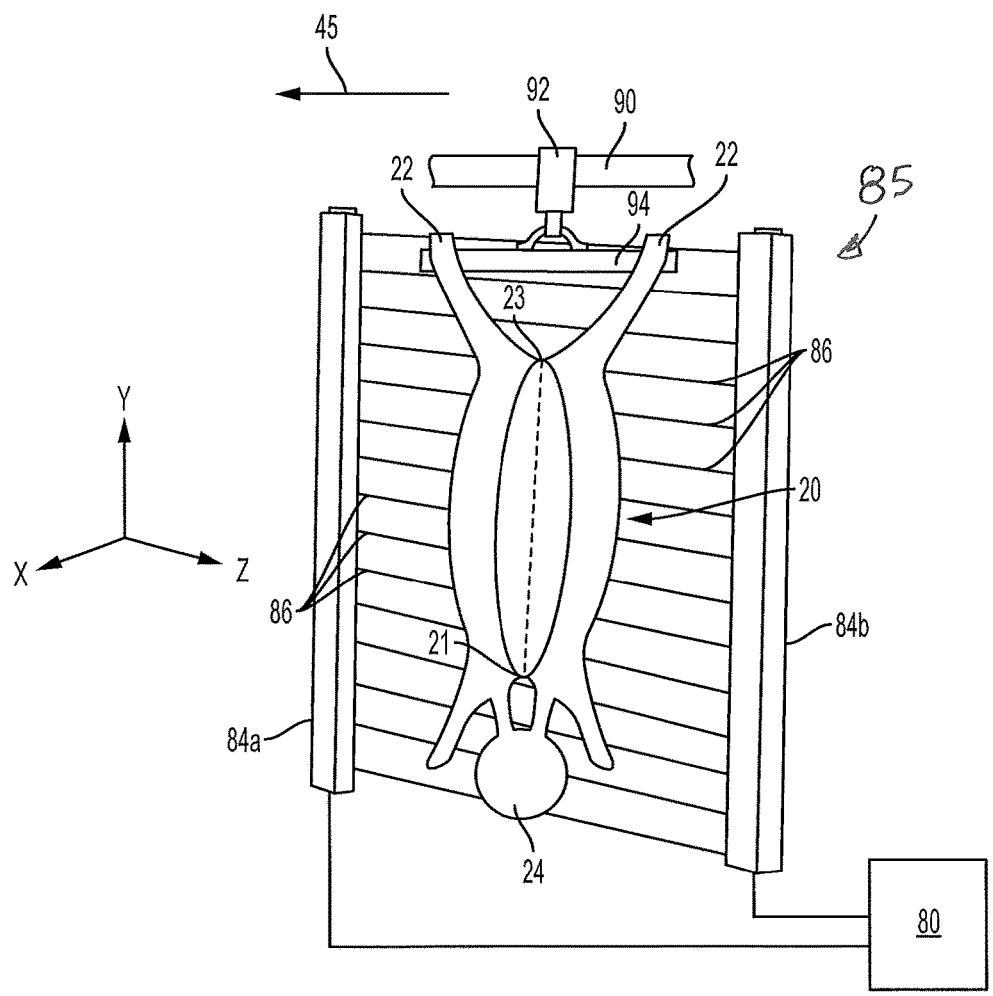
FIG. 11 is a perspective view of a light curtain positioned along a carcass rail measuring length of a carcass supported by a trolley.

In a method typically used in Europe, the carcasses are cut open with the heads still attached by both jowls. In this cases, the backbone splitting process is required to be stopped at atlas joint 21 at the lower end of the suspended carcass, to prevent the saw from cutting into or nicking the severed and hanging head. For these European style cuts, the cutting process parameters are determined and controlled by the length of the carcass. As shown in FIG. 11, provided along the path of and below carcass rail 90 is a light curtain 85 having vertically oriented emitter and receiver 84a, 84b which send out and detect horizontal, spaced light beams 86. As a carcass 20 passes between emitter/receiver 84a, 84b, light beams are blocked by the carcass, and the overall length including head 24 is determined by position of the light beams permitted to pass above and below the carcass. This data is collected, in real-time, and sent to controller 80 to be used to adjust the length of cut on a carcass-by-carcass basis. The vertical length of the cut to be made by saw 74 may be determined by analysis of a group of hog carcasses to correlate carcass length with the location of atlas joint 21 at end of the backbone. Using the statistics developed by such analysis, e.g., an estimate that the atlas joint is located 13 in. (33 cm) above the lower end of head 24, the controller maintains information on the relative position of the carcass and is able to send the proper signal to robot station 50 to effect a particular desired downward length of the saw 74 stroke in the Y-direction as the measured hog is processed downstream of the light curtain. Alternatively, a vision system employing a camera is used to measure the overall length of the carcass and/or determine the location of the atlas joint.

In the event that the condition of a carcass is such that special processing is required, the present invention permits a specific carcass to be identified, and the carcass be tracked by the controller to cause the robot stations to effect other than standard processing to the specifically identified carcasses. For example, it may be required that a carcass pass through the machines un-split if it is designated "retained" by either production personnel or by the USDA. A carcass may be "retained" if there is additional inspection required before the carcass can be further processed. If an end user identifies and designates a carcass to be "retained," an identifiable mark, marker or tag or 89 may be applied to the carcass or adjacent the carcass, as shown on carcass 20b in FIG. 9. A vision system or other sensor may be used to automatically detect the "retained" carcasses, and send the relative location of the retained carcass in the line of carcasses to the controller. Alternatively, a switch may be actuated as the desired carcass passes a particular point of the line, and the information sent to the controller, which then maintains track of the location of the identified carcass as it travels along the carcass rail. When the identified carcass reaches the robot station 50, the special operation may be effected via the controller, for example, to stop processing for that carcass, effect no operation and permit it to remain un-split.

The present invention may also detect gaps or holes in the production line of carcasses. The carcasses carried on the trolleys 94 are spaced in intervals, e.g. 600 mm, 800 mm, or 900 mm apart, in accordance with the spacing of the mechanical pushers 91 on the conveyor chain 95 (FIG. 10). At times, these chain pushers may not be fully populated by trolleys, or there may not be a carcass on every trolley, with the result being gaps or holes in the production line at a location where a carcass would normally be located. These gaps or holes indicating the absence of a carcass may be recorded, tracked and accounted for through the entire production cell, and the operation of the carcass processing device on the robot station may be modified accordingly, for example, to cease operation as the gap passes the robot station. The gaps or holes in the production line may be detected by a vision system or by a mechanical detector that is physically triggered by the presence of a passing carcass. The sensor output may be encoded and combined by the controller with time and/or distance measurement to establish that a carcass has been detected during a desired interval, for example the 600 mm spacing. If no carcass is located in an expanded interval, e.g., 650 mm, then a counter is reset to be triggered by the next passing carcass, and the information of the relative position of the gap is sent to or determined by the controller. The controller maintains information on the relative location of the missing carcass, and instructs the robotic arm to effect no operation when the gap passes in front of the robot station.

Figure 12:
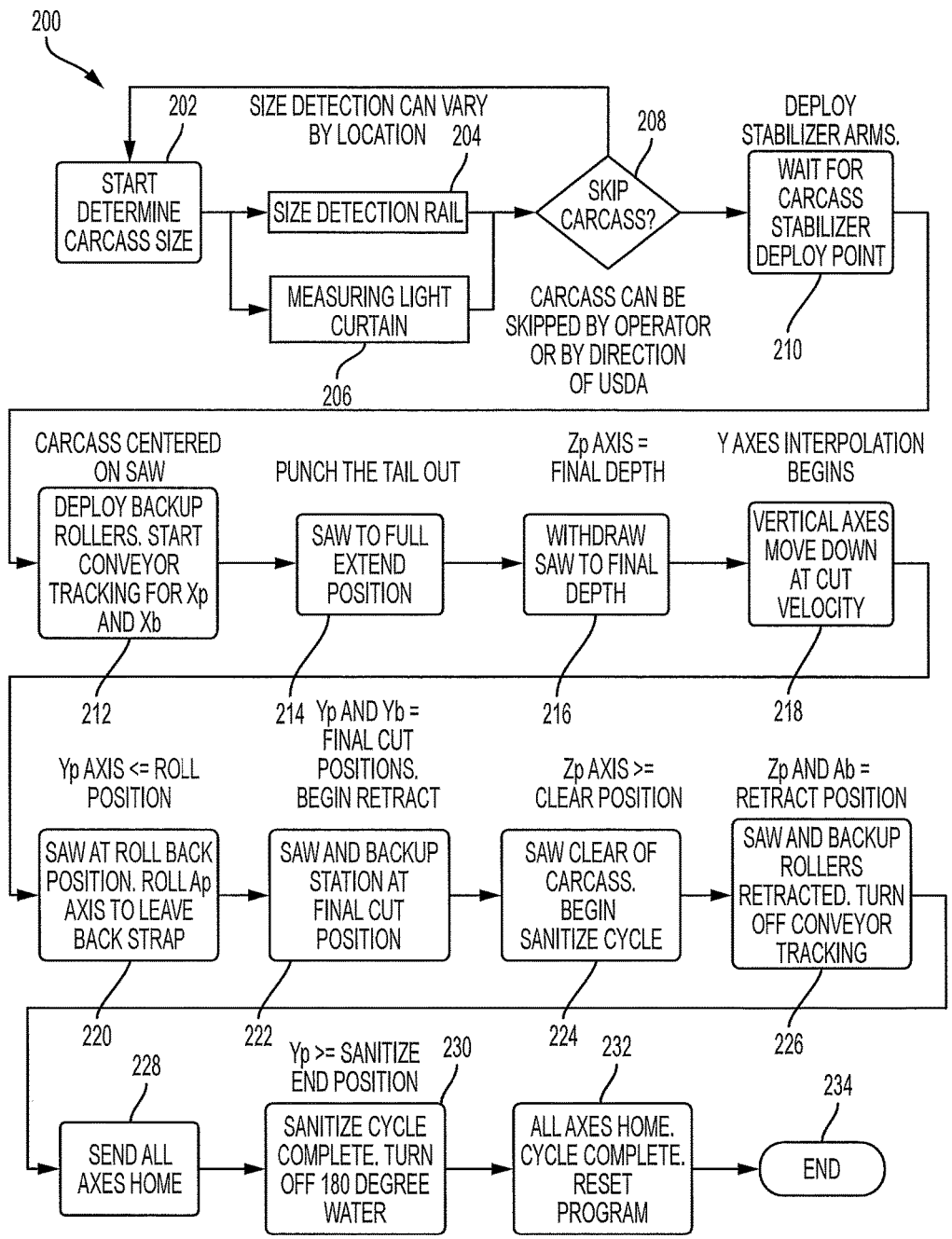
FIG. 12 is a flowchart showing an embodiment of how the method and system of the present invention may operate when processing a carcass in a carcass splitting system.
Figure 13:
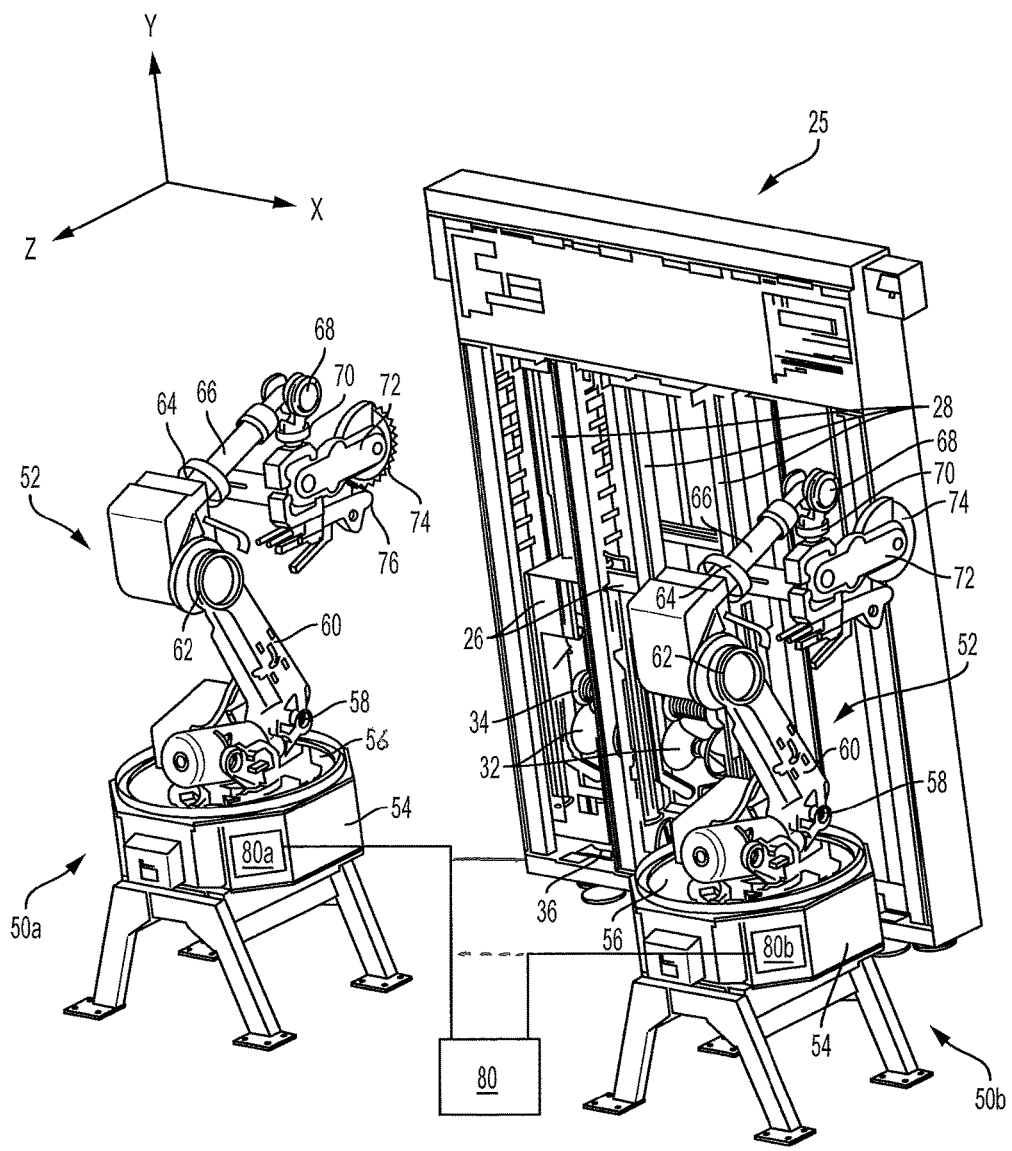
FIG. 13 is a perspective view of a processing station embodiment of the present invention in which a pair of robot stations each having a carcass splitting saw on a robotic arm are positioned opposite a back station for having a pair of back assemblies for supporting the backs of carcasses.
Figure 14:
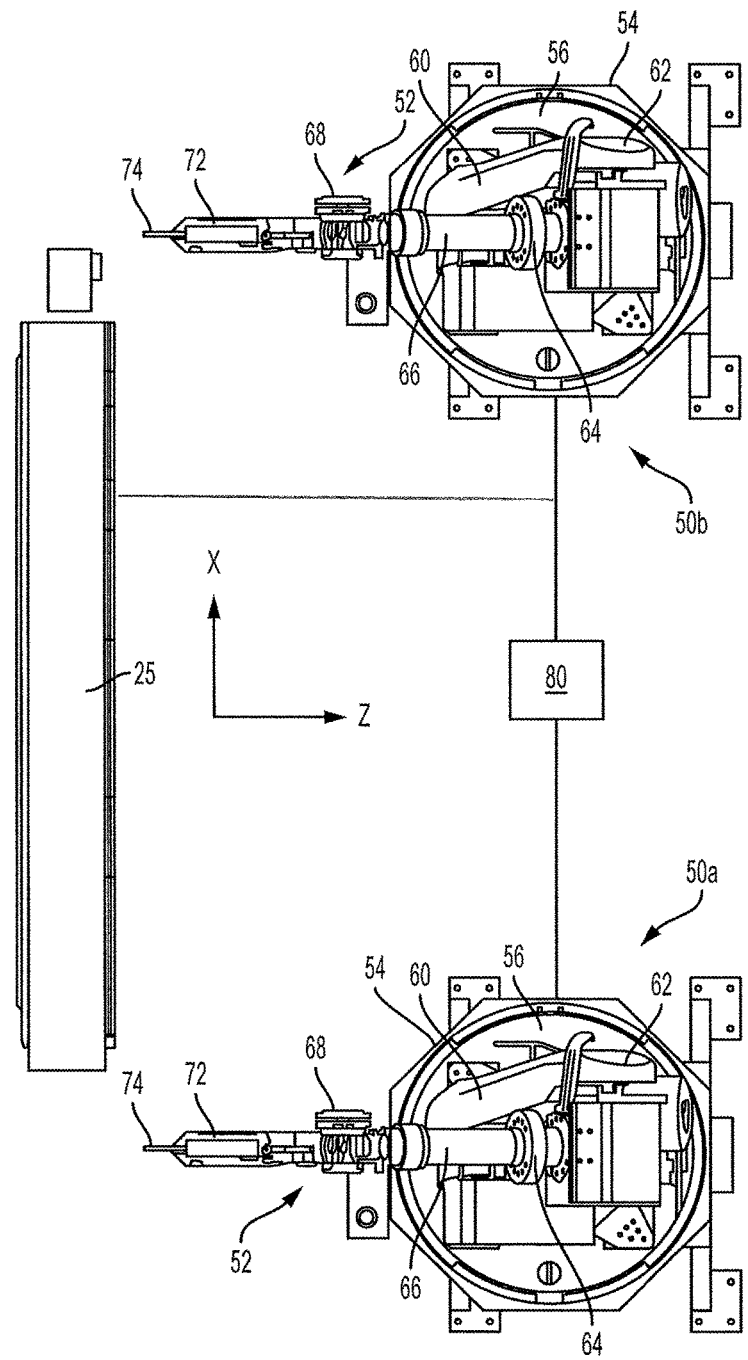
FIG. 14 is a top plan view of the processing station embodiment of FIG. 13.
Figure 15:
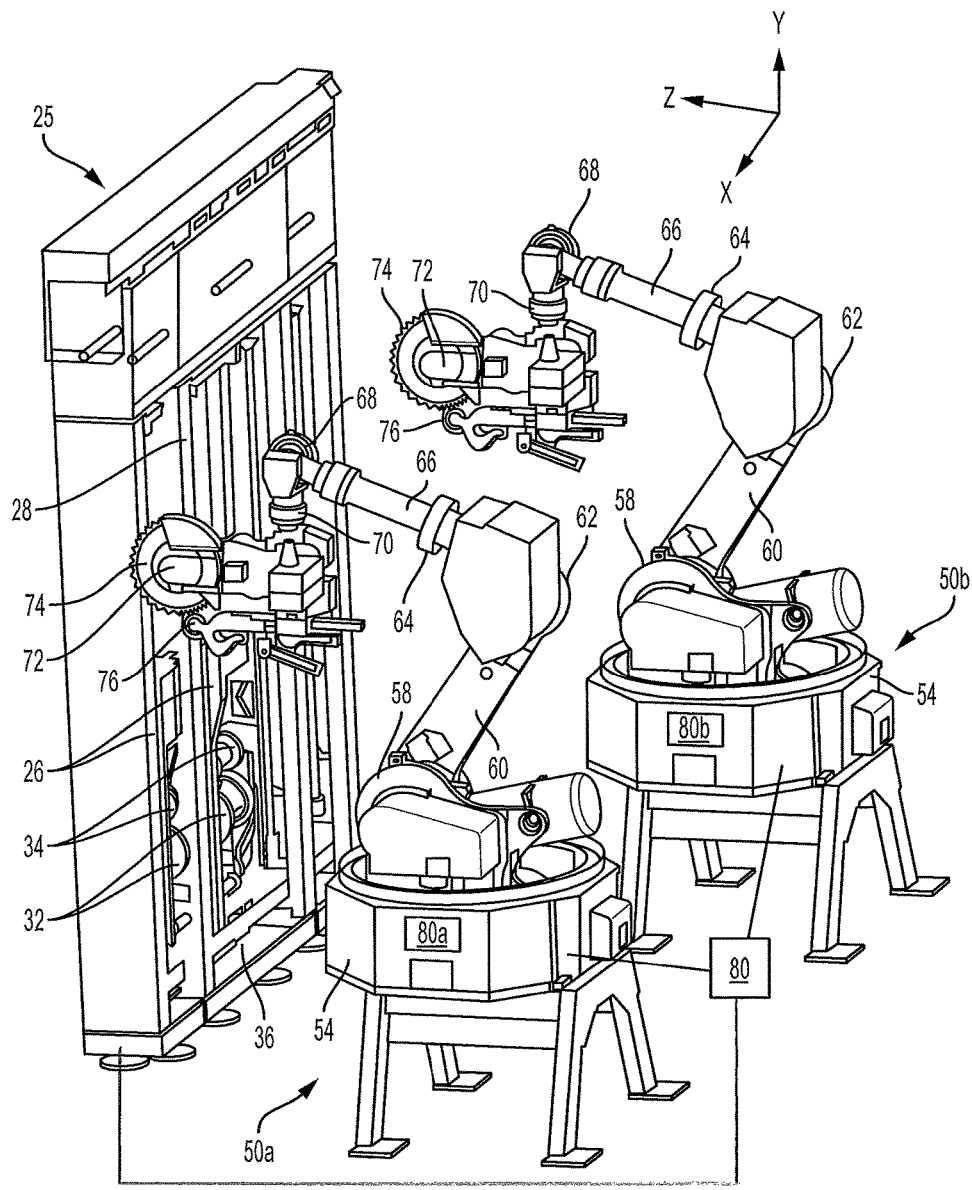
FIG. 15 is another perspective view of the processing station of FIG. 13.
Figure 16:
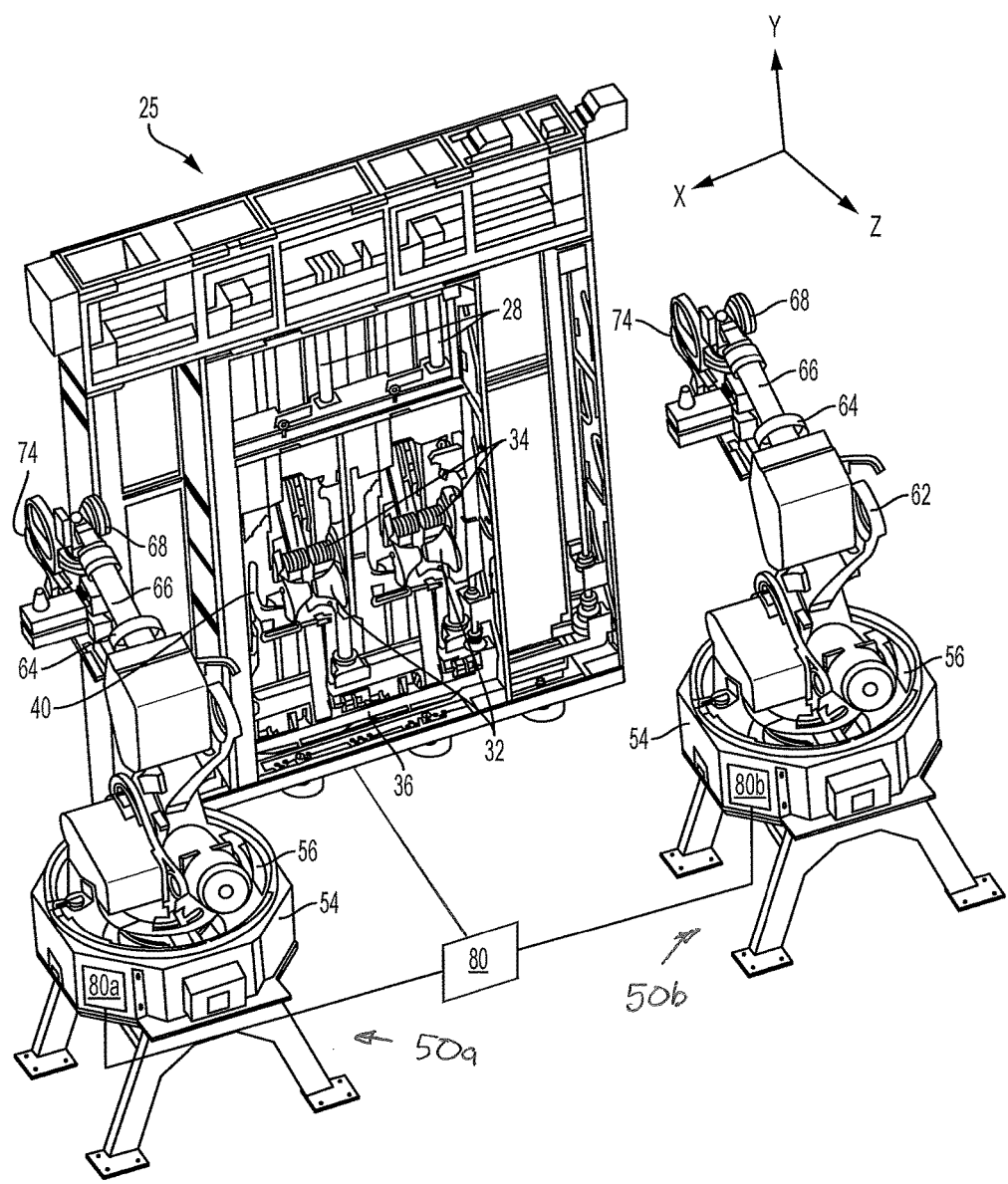
FIG. 16 are other perspective views of the processing station of FIG. 13, showing the back of the robot stations and the front of the back station.
Figure 17:
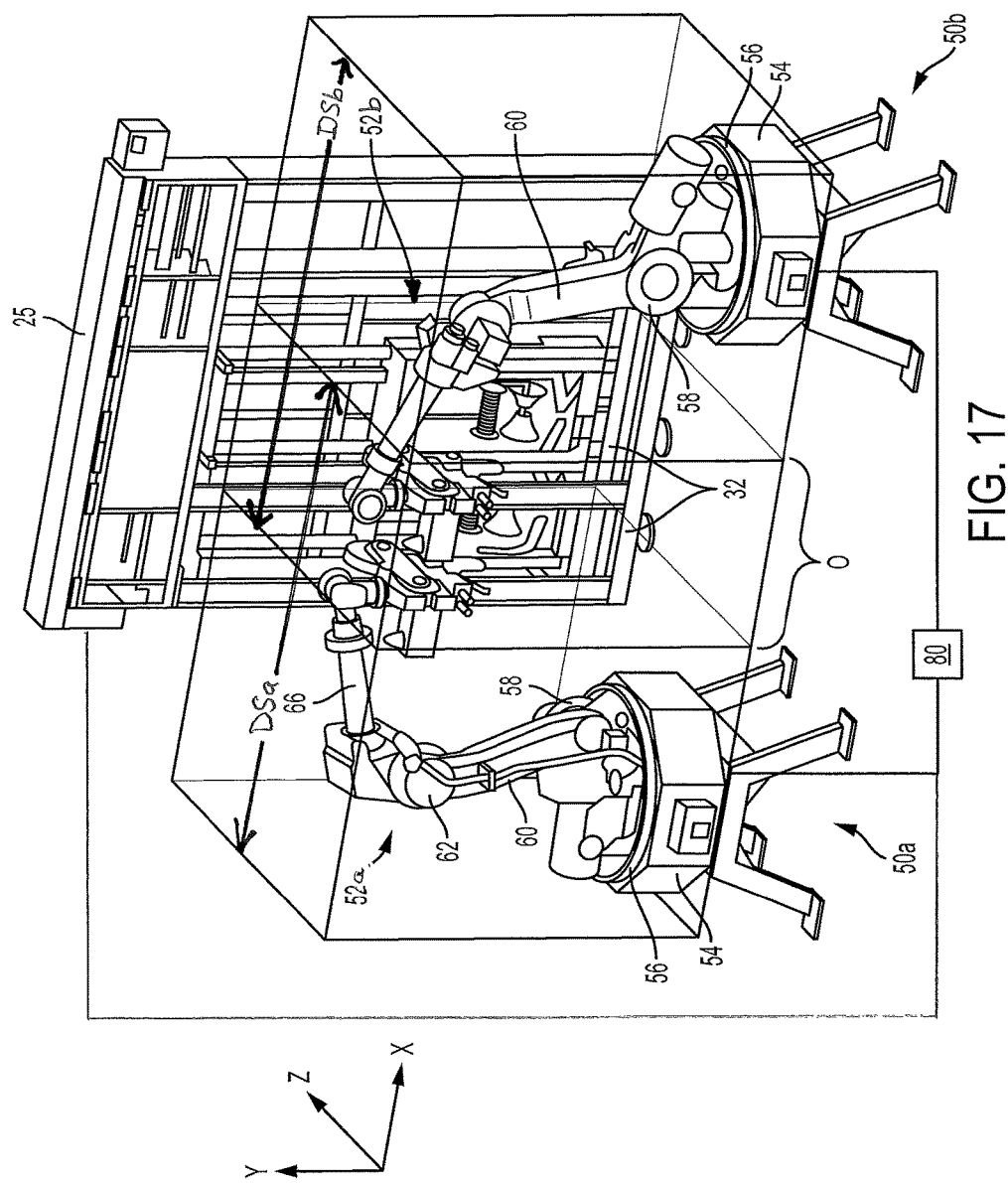
FIG. 17 is a perspective view of the processing station of FIG. 13, showing the designated spaces in which each of the robotic arms may operate, and the overlap of such spaces.

Operation of the system using a single robot station is shown in part in FIG. 12. The method 200 includes determining carcass size 202, either by use of the size detection rail 204 or the measuring light curtain 206, or some other suitable method. The determination may be made whether to skip processing of the carcass 208, either by the operator, by the USDA or other inspector, or by other criteria, and the particular carcass is identified. For those carcasses not identified to skip processing, the stabilizer arms on the back support are deployed 210 and extended to stabilize the carcass before processing on the carcass commences. The carcass is then centered on the back support, the backup rollers are deployed and the conveyor is started 212 to move the carcass, with the controller tracking for the robotic arm Xp and back support Xb distances along the X axis of the conveyor movement. The tail of the carcass is punched out as the saw is moved by the robotic arm to the fully extended position along the Zp axis 214. Once there is indication that the saw has withdrawn to final desired depth along the Zp axis 216, the Y axis interpolation begins 218 as the robotic arm moves the saw downward at the desired cut velocity, while maintaining controlled movement and velocity along the X axis, to process, e.g., split, the carcass. As the saw travels downward along the Yp axis, the controller may determine by the measurement of carcass weight when the saw approaches the carcass back strap position 220, and cause the saw to retract and roll back along the Ap axis so as not to cut the back strap fully. When the saw and back support reach the Yp and Yb final cut positions, respectively, for example as determined by the location of the atlas joint, the robotic arm begins to retract 222 until the saw reaches the Zp position clear of the carcass 224, where the sanitization cycle may begin. The saw and backup rollers are retracted along the Zp and Ab axes, respectively, 226 and the conveyor tracking along the respective Xp and Xb axes is then stopped. The robotic arm, saw and back support are then sent to their respective home positions along all axes 228, the arm and saw are in the Yp sanitization cycle completed end position 230, all axes are home and the processing cycle is completed and the program is reset 232, to end the operation on the carcass 234.

The present invention may employ two or more robot stations to share the carcass processing operation being performed on the carcasses, and for higher line productivity. A pair of side-by-side robot stations 50a, 50b are shown in FIGS. 13-17, with each having the same processing tool, i.e., splitting saw 74 and guide roller 76, and operation as described previously for the single robot station. Each robot station 50a, 50b may have its own controller, 80a 80b, respectively, and controllers 80a and 80b may be linked together to communicate with each other. Alternately, a central controller 80 may control both robot stations 50a, 50b, or central controller 80 may be in communication with the individual controllers 80*a*, 80*b*. to share control responsibilities. To have multiple robot station production machines working in series, or one leading others on a continuous production line, the present invention provides for communication between the plurality of robot stations with information on what work has been completed and what work needs to be performed and/or completed. This includes identifying carcasses for special handling, identifying gaps in the production line of carcasses and identifying the carcass size or weight, as described previously, so that all robot stations downstream in the direction of carcass travel 45 may be properly directed and operate efficiently. In the case of carcass splitting, the controller(s) has to determine accurately and maintain information on which carcasses have been split and which have not been split, so that the individual robot stations 50*a*, 50*b* may be instructed to split or not split a passing carcass.

Figure 18:
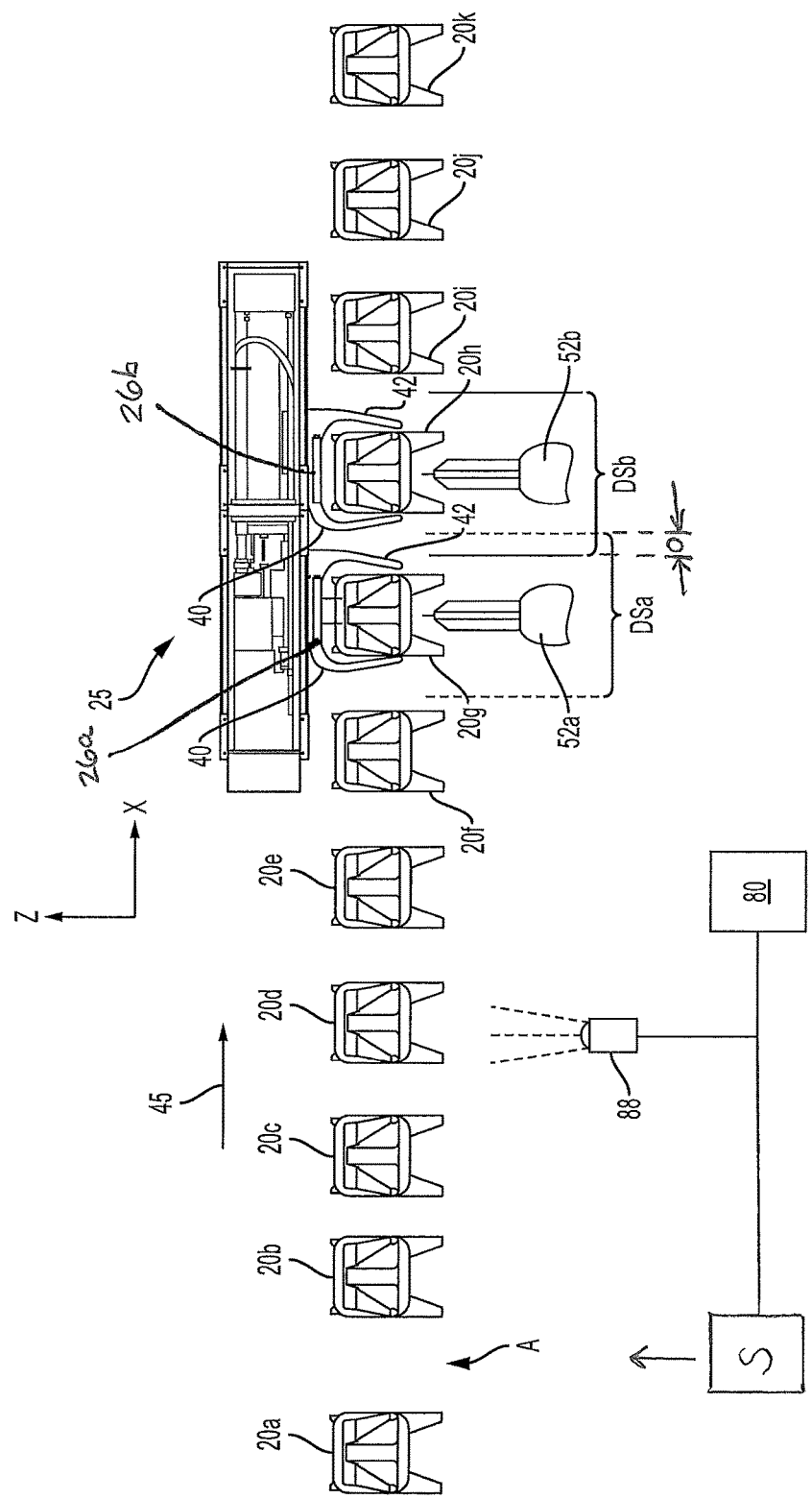
FIG. 18 is a top plan view of the processing station of FIG. 13, showing the ends of the pair of robotic arms and the back station, and showing the designated spaces in which each of the robotic arms may operate, and the overlap of such spaces during processing of a plurality of hog carcasses in an assembly line.

Back station 25 may have a pair of back carriage assemblies, one for each robot station, and controller 80 may provide multiple axis interpolation control for linear axes on each back carriage assembly to drive the separate back support for the carcass in synchronized motion. FIG. 18 shows an assembly line having suspended carcasses 20*a*-20*k* moving downstream in direction 45 toward the processing station comprising saws on robotic arms 52*a*, 52*b* and respective supporting back station assemblies 26*a*, 26*b*. Carcasses 20*a*-20*f* are awaiting processing, carcasses 20*i*-20*k* have already been split, and carcasses 20*g* and 20*h* are undergoing splitting by saws on robotic arms 52*a*, 52*b*, respectively. Each individual processing tool on robotic arms 52*a*, 52*b* and respective assigned back support 26*a*, 26*b*, can be moved synchronously with the respective carcass 20*g*, 20*h*, on the carcass rail that it is assigned to process.

The intercommunications between the robot stations 50*a*, 50*b* operating the robotic arms 52 and saws 74 along the production line may be referred to as hand-shaking. Handshaking signals can either be hardware signals or networked communication between robot stations. The hardware handshaking signals may be accomplished with discrete (physical) input and output signals. Each robot station may update a register stack based on a "heart beat" signal which is synchronized between the robot stations and also with the overhead conveyor moving the carcasses on the carcass rail. In this manner a carcass may be tracked through the entire production cell. There may be contained in the register information on the status of each particular carcass. Such information may include whether or not the carcass has been previously split by another machine, and can also include size parameters, e.g., mass and/or length, of a particular carcass, or whether there is a gap in the line of carcasses. The robot stations 50*a*, 50*b* will then either split or effect no operation on a particular carcass based on the information contained in this register.

The stack register can also be extended upstream of, i.e., prior to, the machines to allow an end user to designate one or more positions on the production line with the authority to "retain" or not split a particular carcass. An example is shown in FIG. 18, where two robot stations (not shown) are operating saws 74 on side-by-side robot arms 52*a*, 52*b*. A manual switch S may be used by an operator and engaged to signal the location of a carcass, e.g., carcass 20*b*, which relative location is then transmitted to controller 80 to create the register information and track that particular carcass for special processing. Camera 88 in FIG. 18 is in communication with controller 80 and may be used as a sensor to a) determine the presence of gaps or holes in the normal interval signifying the absence A of a carcass, b) sense the presence of a specially applied mark on the carcass to signify special processing or handling, and/or c) measure a size parameter of the carcass to determine the cutting parameters of the splitting saw. Controller 80 then communicates as necessary with the robot stations to guide robotic arms 52*a*, 52*b* and their respective back carriages 26*a*, 26*b*. As an alternative to the use of stack registers, any other mode of communicating the relevant signals, information and data about the carcasses may be employed among the controller(s), the robot stations and the carriages on the back station.

The individual robot stations may be spaced in locations sufficiently far apart from each other, and the associated back station carriages may be likewise spaced, so that each robotic arm 50*a*, 50*b* has full freedom of movement to permit both to process their respective hog carcasses simultaneously, without physical interference with each other. However, in a double (or more) arm system, the two robot arms 52*a*, 52*b* may be so closely located because of space or other constraints that they may need to operate in overlapping space as shown by the respective defined spaces DSa and DSb for each of the robot arms, shown in FIGS. 17 and 18. The three-dimensional box shape indicated for each parallelepiped space DSa and DSb represents the maximum extent of the horizontal (X-axis), vertical (Y-axis) and depth (Z-axis) motion of the robotic arms 52*a*, 52*b*, respectively. The overlap between the two individual arm defined spaces DSa and DSb is indicated as space O. The robotic controller (either the master controller 80 or the individual controllers 80*a*, 80*b*, or some combination) have the information on the respective defined spaces DSa and DSb and communicate with the individual robot arms 52*a*, 52*b* to lock or clear space for each other. The controller(s) may send a signal to or between the individual robot stations having Cartesian coordinate data of the location of one or the other or both of the robotic arms 52*a*, 52*b*. When an arm is in a defined space, that space is considered locked against intrusion by any other device, and the other arm does not enter that space. When the arm leaves that space, the space is unlocked or cleared and the other arm is free to enter that space. For example, when robotic arm 52*a* is operating in its defined space DSa, robotic arm 50*b* is not permitted to enter that space, and either must stop its movement, or limit its movement to space outside of DSa. Likewise, when robotic arm 52*b* is operating in its defined space DSb, robotic arm 50*a* is not permitted to enter that space, and either must stop its movement, or limit its movement to space outside of DSb. Spaces DSa and DSb may be designated in other manners than those shown in FIGS. 71 and 18.

Except for the control of entry into their respective defined spaces and the determination of which robotic arm is to split which carcass, the robotic arms and processing tools and the back carriages are controlled and operate in the same manner as shown in FIG. 12.

An embodiment of a robotic arm(s), back support(s) and controller(s) of the present invention may take the form of a hardware embodiment that uses software (including firmware, resident software, micro-code, etc.). Furthermore, an embodiment may take the form of a computer program product on a tangible computer-usable storage medium having computer-usable program code embodied in the medium. A memory device or memory portion of controller 80, 80*a*, 80*b* can form the medium. Computer program code or firmware to carry out an embodiment of the present disclosure could also reside on optical or magnetic storage media, especially while being transported or stored prior to or incident to the loading of the computer program code or firmware into a door closer. This computer program code or firmware can be loaded, as an example, by connecting a computer system or external controller to the programming interface.

It should be appreciated and understood that the present invention may be embodied as systems, methods, apparatus, computer readable media, non-transitory computer readable media and/or computer program products. The present invention may take the form of an entirely hardware embodiment, an entirely software embodiment (including firmware, resident software, micro-code, etc.) or an embodiment combining software and hardware aspects that may all generally be referred to herein as a "circuit," "module" or "system." The present invention may take the form of a computer program product embodied in one or more computer readable medium(s) having computer readable program code embodied thereon.

One or more computer readable medium(s) may be utilized, alone or in combination. The computer readable medium may be a computer readable storage medium or a computer readable signal medium. A suitable computer readable storage medium may be, for example, but not limited to, an electronic, magnetic, optical, electromagnetic, infrared, or semiconductor system, apparatus, or device, or any suitable combination of the foregoing. Other examples of suitable computer readable storage medium would include, without limitation, the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. A suitable computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computing device (such as, a computer), partly on the user's computing device, as a stand-alone software package, partly on the user's computing device and partly on a remote computing device or entirely on the remote computing device or server. In the latter scenario, the remote computing device may be connected to the user's computing device through any type of network, including a local area network (LAN) or a wide area network (WAN), or the connection may be made to an external computing device (for example, through the Internet using an Internet Service Provider).

The present invention is described herein in FIG. 12 with reference to flowchart illustrations and/or block diagrams of methods, apparatus (systems), computer readable media, non-transitory computer readable media, and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computing device (such as, a computer), special purpose computing device, or other programmable data processing apparatus to produce a machine, such that the instructions, which execute via the processor of the computing device or other programmable data processing apparatus, create means for implementing the functions/acts specified in the flowchart and/or block diagram block or blocks.

These computer program instructions may also be stored in a computer readable medium that can direct a computing device, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computing device, other programmable data processing apparatus, or other devices to cause a series of operational steps to be performed on the computing device, other programmable apparatus or other devices to produce a computer implemented process such that the instructions which execute on the computing device or other programmable apparatus provide processes for implementing the functions/acts specified in the flowchart and/or block diagram block or blocks.

It should be appreciated that the function blocks or modules shown in the drawings illustrate the architecture, functionality, and operation of possible implementations of systems, methods and computer program media and/or products according to various embodiments of the present invention. In this regard, each block in the drawings may represent a module, segment, or portion of code, which comprises one or more executable instructions for implementing the specified logical function(s). It should also be noted that, in some alternative implementations, the functions noted in the block may occur out of the order described herein or as noted in FIG. 12. For example, the function of two blocks shown in succession may, in fact, be executed substantially concurrently, or the blocks may sometimes be executed in the reverse order, depending upon the functionality involved. It will also be noted that each block and combinations of blocks in any one of the drawings can be implemented by special purpose hardware-based systems that perform the specified functions or acts, or combinations of special purpose hardware and computer instructions. Also, although communication between function blocks or modules may be indicated in one direction on the drawings, such communication may also be in both directions.

Accordingly, the present invention achieves one or more of the objects above. The method and system of the invention permits robot stations to be used at stationary base positions to process animal carcasses, including splitting suspended hog or beef carcasses, and maintain control of movement of the processing tool while the carcasses are continuously moving along an assembly line. Information on the relative location of a supported carcass that requires special handling, or the absence of a carcass on the assembly line, may be used to control downstream processing tools. The instant method and system also permit control over the saw cutting movement to properly cut the backbones of hog carcasses in either U.S. or European style carcass processing. When using processing tools on multiple robot stations, the present invention permits the system to know which carcasses have been processed and which have not been processed, so that proper instructions may be given automatically to a robot station to effect or not effect processing of a particular carcass. The invention further enables robotic arms of closely spaced robot stations to operate without interference with each other.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

LIST OF FEATURES

A missing carcass
DSa defined space of robotic arm
DSb defined space of robotic arm
O overlap of robotic arm motion
Carcass
  20 hog carcass
  21 atlas joint
  22 feet
  23 backbone base
  24 head
Back Support
  25 back station
  26 back carriage
  28 vertical guide rail
  30 back roller assembly
  32 lower guide
  34 guide rollers
  36 horizontal guide track
  40 support arm
  42 support arm
  44 direction of saw stroke downward
  45 direction of carcass movement on rail
Robotic Arm
  50 robot station
  52 robotic arm assembly
  54 base
  56 turntable joint
  58 joint
  60 link segment
  62 joint
  64 joint
  66 link segment
  68 joint
  70 link segment
  72 saw arm
  74 saw
  76 front guide roller
Control
  80 controller
  82 transducer
  83 actuator
  84 light curtain emitter/receiver
  86 light beams
  88 camera
  89 carcass mark
Carcass Rail
  90 carcass rail
  91 pusher
  92 trolley
  93 wheel
  94 gambrel
  95 drive chain

The invention claimed is:

1. A method of controlling a robotic carcass processing system comprising:
  providing a line of carcasses to be processed, the line moving the carcasses past a processing station;
    providing at the processing station on one side of the line a robotic arm having multiple axes of motion and a carcass processing tool mounted to the robotic arm;
  providing a robotic controller in communication with the robotic arm and the back support for controlling and moving the multiple axes of the robotic arm to move the carcass processing tool in Cartesian space via inverse kinematics and having interpolation control over the multiple axes of the robotic arm;
  continuously moving a plurality of carcasses on the line sequentially past the processing station;
  while a selected carcass is passing the processing station, synchronously moving the back support relative to the selected carcass and using the controller to move the carcass processing tool in Cartesian space via inverse kinematics and having interpolation control over the multiple axes of the robotic arm to synchronously move the carcass processing tool relative to the selected carcass and the back support as the selected carcass moves continuously on the line sequentially past the processing station.

2. The method of claim 1 further including providing at the processing station on the other side of the line a back support having multiple axes of motion for supporting a carcass during processing, the back support moving with the carcass processing tool relative to a selected carcass to be processed.

3. The method of claim 2 wherein the controller has interpolation control over the multiple axes of the back support to synchronously move the carcass processing tool and the back support relative to the selected carcass as the selected carcass moves continuously on the line sequentially past the processing station.

4. The method of claim 1 wherein the robotic arm comprises a plurality of links and a plurality of moveable joints connected to the links, and wherein the controller moves the plurality of moveable joints to maintain the carcass processing tool synchronously with the selected carcass in the direction along the line of carcasses to process the selected carcass.

5. The method of claim 4 wherein the robotic arm is moveably connected to a stationary base, and after processing the selected carcass in the line of carcasses, the controller moves the robotic arm along a first axis upstream along the line of carcasses and moves the plurality of moveable joints to maintain the carcass processing tool synchronously along the first axis with another selected carcass in the direction along the line of carcasses to process the other selected carcass.

6. The method of claim 5 wherein the carcass comprises a hog carcass, the carcass processing tool comprises a splitting saw and the back support comprises a back roller.

7. The method of claim 6 wherein the robotic arm comprises a plurality of links and a plurality of moveable joints connected to the links, the splitting saw may be extended and retracted from the robotic arm and wherein the controller: a) moves the plurality of moveable joints to maintain the splitting saw synchronously along a first axis with the selected carcass in the direction along the line of carcasses being processed; b) simultaneously moves the plurality of moveable joints to: i) extend the splitting saw along a second axis to contact the selected hog carcass, ii) move the saw along a third axis in a direction normal to the line of carcasses to make a desired cut on the selected hog carcass, and iii) retract the splitting saw from the selected hog carcass along the second axis after the desired cut is made; and c) after processing the selected hog carcass in the line of carcasses, moves the robotic arm along the first axis upstream along the line of carcasses to another selected hog carcass and repeats steps (a) and (b) to process the other selected hog carcass.

8. The method of claim 1 wherein the carcass comprises a beef carcass, and the carcass processing tool comprises a band saw.

9. A robotic controlled carcass processing system comprising:
a robotic arm having multiple axes of motion;
a carcass processing tool mounted to the robotic arm;
a robotic controller for controlling and moving the multiple axes of the robotic arm to move the carcass processing tool in Cartesian space via inverse kinematics and having interpolation control over the multiple axes of the robotic arm to synchronously move the carcass processing tool relative to a selected carcass to be processed.

10. The system of claim 9 further including a back support having multiple axes of motion moveable with the carcass processing tool relative to a selected carcass to be processed.

11. The system of claim 10 wherein the robotic controller further has interpolation control over the multiple axes of the back support to synchronously move the carcass processing tool and the back support relative to a selected carcass to be processed.

12. The system of claim 9 wherein the system processes carcasses moving along a line, the robotic arm comprises a plurality of links and a plurality of moveable joints connected to the links, and wherein the controller moves the plurality of moveable joints to maintain the carcass processing tool synchronously with the selected carcass in the direction along the line of carcasses to process the selected carcass.

13. The system of claim 10 wherein the robotic arm is moveably connected to a stationary base, and after processing the selected carcass in the line of carcasses, the controller moves the robotic arm along a first axis upstream along the line of carcasses and the controller moves the plurality of moveable joints to maintain the carcass processing tool synchronously along the first axis with another selected carcass in the direction along the line of carcasses to process the other selected carcass.

14. The system of claim 9 wherein the carcass comprises a hog, the carcass processing tool comprises a splitting saw and the back support comprises a back roller.

15. The system of claim 14 wherein the system processes carcasses moving along a line, the robotic arm comprises a plurality of links and a plurality of moveable joints connected to the links, the splitting saw may be extended and retracted from the robotic arm and wherein the controller: a) moves the plurality of moveable joints to maintain the splitting saw synchronously along a first axis with a selected carcass in the direction along the line of carcasses being processed; b) simultaneously moves the plurality of moveable joints to: i) extend the splitting saw along a second axis to contact the selected hog carcass, ii) move the saw along a third axis in a direction normal to the line of carcasses to make a desired cut on the selected hog carcass, and iii) retract the splitting saw from the selected hog carcass along the second axis after the desired cut is made; and c) after processing the selected hog carcass in the line of carcasses, moves the robotic arm along the first axis upstream along the line of carcasses to another selected hog carcass and repeats steps (a) and (b) to process the other selected hog carcass.

16. A method of controlling a robotic carcass processing system comprising:
providing a line of carcasses to be processed, the line moving the carcasses past a processing station;
providing at the processing station along the line at least two robotic arms, each having multiple axes of motion and at least two carcass processing tools, one mounted to each of the robotic arms;
providing a robotic controller for controlling and moving the multiple axes of the at least two robotic arms and their respective carcass processing tools;
defining a space encompassing physical space needed for movement of each robotic arm and its respective carcass processing tool during processing of a selected carcass along the line; and
using the robotic controller to determine when one of the at least two robotic arms has moved its respective carcass processing tool out of its respective defined space to indicate that space is clear and to permit one of the other at least two robotic arms and their respective carcass processing tools to enter the defined space.

17. The method of claim 16 including at least two robotic controllers, one for each robotic arm for controlling and moving the multiple axes of its respective robotic arm, each robotic controller sending a signal when its respective arm has moved its respective carcass processing tool out of a defined space to indicate that space is clear and to permit one of the other at least two robotic arms to enter the defined space.

18. The method of claim 17 wherein the signal is Cartesian coordinate data of the location of the robotic arm.

19. The method of claim 16 wherein each robotic arm comprises a plurality of links and a plurality of moveable joints connected to the links, and including moving the defined space synchronously with a selected carcass in a direction along the line of carcasses, and causing at least one controller to move the plurality of moveable joints on its respective robotic arm to maintain its respective carcass processing tool within the defined space and synchronously with the selected carcass to process the selected carcass.

20. The method of claim 19 wherein each robotic arm is moveably connected to a stationary base, and including, after processing the selected carcass in the line of carcasses, causing the at least one controller to move its respective robotic arm along a first axis upstream along the line of carcasses and move the plurality of moveable joints to maintain the carcass processing tool within the defined space and synchronously along the first axis with another selected carcass in the direction along the line of carcasses to process the other selected carcass.

21. The method of claim 20 wherein the stationary bases of each robotic arm are disposed side-by-side along a continuously moving line of hogs to be processed, and after sending the signal from the one robotic controller when its respective arm has moved its respective carcass processing tool out of its respective defined space, causing the other controller to move the other of the at least two robotic arms and its respective carcass processing tool into the defined space.

22. The method of claim 16 wherein the carcass comprises a hog and each carcass processing tool comprises a splitting saw.

23. The method of claim 22 wherein each robotic arm is moveably connected to a stationary base, the stationary bases being disposed side-by-side along a continuously moving line of hog carcasses to be processed, each robotic arm comprises a plurality of links and a plurality of moveable joints connected to the links, each splitting saw may be extended and retracted from its respective robotic arm and including causing each controller to: a) move the plurality of moveable joints of its respective robotic arm to maintain the splitting saw synchronously along a first axis with a selected carcass in the direction along the line of carcasses being processed; b) simultaneously move the plurality of moveable joints to: i) extend the splitting saw along a second axis to contact the selected hog carcass, ii) move the saw along a third axis in a direction normal to the line of carcasses to make a desired cut on the selected hog carcass, and iii) retract the splitting saw from the selected hog carcass along the second axis after the desired cut is made; and c) after processing the selected hog carcass in the line of carcasses, move its respective robotic arm along the first axis upstream along the line of carcasses to another selected hog carcass and repeat operations (a) and (b) to process the other selected hog carcass, and wherein the defined space of each robotic arm comprises physical space occupied by the respective robotic arm and its respective splitting saw during operations (a) and (b).

24. A robotic controlled carcass processing system comprising:
    at least two robotic arms, each having multiple axes of motion;
    at least two carcass processing tools, one mounted to each of the robotic arms;
    a robotic controller for controlling and moving the multiple axes of the at least two robotic arms, the robotic controller determining when one of the at least two robotic arms has moved its respective carcass processing tool out of a defined space to indicate that space is clear and to permit one of the other at least two robotic arms to enter the defined space.

25. The system of claim 24 including at least two robotic controllers, one for each robotic arm for controlling and moving the multiple axes of its respective robotic arm, each robotic controller sending a signal when its respective arm has moved its respective carcass processing tool out of a defined space to indicate that space is clear and to permit one of the other at least two robotic arms to enter the defined space.

26. The system of claim 25 wherein the signal is Cartesian coordinate data of the location of the robotic arm.

27. The system of claim 24 wherein the system processes carcasses moving along a line, each robotic arm comprises a plurality of links and a plurality of moveable joints connected to the links, the defined space moves synchronously with a selected carcass in a direction along the line of carcasses, and wherein at least one controller moves the plurality of moveable joints on its respective robotic arm to maintain its respective carcass processing tool within the defined space and synchronously with the selected carcass to process the selected carcass.

28. The system of claim 27 wherein each robotic arm is moveably connected to a stationary base, and after processing the selected carcass in the line of carcasses, the at least one controller moves its respective robotic arm along a first axis upstream along the line of carcasses and the controller moves the plurality of moveable joints to maintain the carcass processing tool within the defined space and synchronously along the first axis with another selected carcass in the direction along the line of carcasses to process the other selected carcass.

29. The system of claim 24 wherein the carcass comprises a hog and each carcass processing tool comprises a splitting saw.

30. The system of claim 29 wherein each robotic arm is moveably connected to a stationary base, the stationary bases being disposed side-by-side along a continuously moving line of hog carcasses to be processed, each robotic arm comprises a plurality of links and a plurality of moveable joints connected to the links, each splitting saw may be extended and retracted from its respective robotic arm and wherein each controller: a) moves the plurality of moveable joints of its respective robotic arm to maintain the splitting saw synchronously along a first axis with a selected carcass in the direction along the line of carcasses being processed; b) simultaneously moves the plurality of moveable joints to: i) extend the splitting saw along a second axis to contact the selected hog carcass, ii) move the saw along a third axis in a direction normal to the line of carcasses to make a desired cut on the selected hog carcass, and iii) retract the splitting saw from the selected hog carcass along the second axis after the desired cut is made; and c) after processing the selected hog carcass in the line of carcasses, moves its respective robotic arm along the first axis upstream along the line of carcasses to another selected hog carcass and repeats operations (a) and (b) to process the other selected hog carcass, and wherein the defined space of each robotic arm comprises physical space occupied by the respective robotic arm and its respective splitting saw during operations (a) and (b).

31. A method of processing a suspended carcass as the carcass is moved along a defined path comprising:
    providing a carcass rail having a plurality of trolleys movable along the rail, each trolley capable of supporting an animal carcass;
    providing a carcass processing device capable of effecting a processing operation on a carcass supported by a trolley moving along the carcass rail;
    providing a controller in communication with the carcass rail and the carcass processing device;
    providing an identification to a desired supported carcass on the carcass rail prior to the carcass passing a processing device to signify a condition of the carcass that requires special handling of the carcass;
    moving a plurality of supported carcasses on the carcass rail past the carcass processing device;
    using the carcass processing device, effecting a standard processing operation on each of the carcasses as the carcasses pass the carcass processing device;
    identifying to the controller the carcass having the identification;

sending a signal from the controller to the carcass processing device to change the standard processing operation effected on the carcass having the identification and effect a different operation from the standard processing operation as the carcass having the mark passes the carcass processing device.

32. The method of claim 31 wherein the controller signal to the carcass processing device comprises a signal synchronized with the carcass processing device and the movement of carcasses along the carcass rail, the signal including a register containing data on the carcass having the identification.

33. The method of claim 32 including providing a sensor capable of detecting a mark on a supported carcass, and further including:
providing the identification to a desired supported carcass on the carcass rail by placing a mark on the desired supported carcass on the carcass rail prior to the carcass passing the processing device to signify a condition of the carcass that requires special handling of the carcass;
identifying with the sensor the carcass having the mark;
sending a signal from the sensor to the controller; and
sending a signal from the controller to the carcass processing device to change the standard processing operation effected on the carcass having the mark and effect a different operation from the standard processing operation as the carcass having the mark passes the carcass processing device.

34. The method of claim 33 wherein the carcass is a hog carcass, the mark is a tag placed on the hog carcass, the carcass processing device includes a splitting saw, the standard processing operation is splitting the carcass, the sensor includes a vision system to detect the mark tag and the different operation is not splitting the hog carcass having the mark.

35. The method of claim 31 including providing a switch to identify position of a desired supported carcass among the plurality of supported carcasses on the carcass rail, and further including providing the identification to a desired supported carcass on the carcass rail by engaging the switch to identify the desired supported carcass on the carcass rail prior to the carcass passing the processing device to signify a condition of the carcass that requires special handling of the carcass.

36. A method of processing a suspended carcass as the carcass is moved along a defined path comprising:
providing a carcass rail having a plurality of trolleys spaced at desired intervals and movable along the rail, each trolley capable of supporting an animal carcass;
providing a carcass processing device capable of effecting a processing operation on a carcass supported by a trolley moving along the carcass rail;
providing a sensor capable of detecting absence of a carcass at the desired interval on the rail;
providing a controller in communication with the carcass rail, the carcass processing device and the sensor;
moving a plurality of supported carcasses on the carcass rail past the carcass processing device;
using the carcass processing device, effecting a standard processing operation on each of the carcasses at the desired interval as the carcasses pass the carcass processing device;
identifying with the sensor the absence of a carcass at the desired interval on the rail;
sending a signal from the sensor to the controller;
using the controller, recording location of the interval of the rail having no carcass; and sending a signal from the controller to the carcass processing device to change the standard processing operation at the interval of the rail having no carcass.

37. The method of claim 36 wherein the controller signal to the carcass processing device comprises a signal synchronized with the carcass processing device and the movement of carcasses along the carcass rail, the signal including a register containing data on the absence of the carcass to be processed by the carcass processing device.

38. The method of claim 36 further including providing downstream on the carcass rail another carcass processing device capable of effecting a processing operation on a carcass supported by a trolley moving along the carcass rail, and using the controller, sending the location of the interval of the rail having no carcass to the other carcass processing device and changing the standard processing operation of the other carcass processing device at the interval of the rail having no carcass.

39. The method of claim 36 wherein the carcass is a hog carcass, the carcass processing device includes a splitting saw, the standard processing operation is splitting the carcass, the sensor includes a vision system to detect the absence of a carcass at the desired interval on the rail, and the change in the standard processing operation is to effect no processing operation at the interval on the rail having no carcass.

40. A method of processing a suspended carcass as the carcass is moved along a defined path comprising:
providing a carcass rail having a plurality of trolleys spaced at desired intervals and movable along the rail, each trolley capable of supporting an animal carcass;
providing first and second carcass processing devices each capable of effecting a processing operation on a carcass supported by a trolley moving along the carcass rail, the carcass rail passing a trolley sequentially past the first carcass processing device and the second carcass processing device;
providing a sensor capable of detecting location of a supported carcass on the carcass rail;
providing a controller in communication with the carcass rail, and the first and second carcass processing devices;
moving a plurality of supported carcasses on the carcass rail past the first and second carcass processing devices;
identifying with the sensor the location of a carcass on the carcass rail;
sending a signal from the sensor to the controller with the location of the carcass;
sending a signal from the controller to the first carcass processing device to effecting a standard processing operation on the carcass identified by the sensor as the identified carcasses passes the carcass processing device; and
using the controller, causing the second carcass processing device to effect no processing operation on the carcass identified by the sensor as the identified carcasses passes the carcass processing device.

41. The method of claim 40 wherein the controller signal to the first carcass processing device comprises a signal synchronized with the carcass processing device and the movement of carcasses along the carcass rail, the signal including a register containing data on processing previously performed on the carcass to be processed by the first carcass processing device.

42. The method of claim 40 further including:
identifying with the sensor the location of another carcass on the carcass rail;

sending a signal from the sensor to the controller with the location of the other carcass;
using the controller, causing the first carcass processing device to effect no processing operation on the other carcass identified by the sensor as the other identified carcasses passes the carcass processing device; and
sending a signal from the controller to the second carcass processing device to effecting a standard processing operation on the other carcass identified by the sensor as the other identified carcasses passes the carcass processing device.

43. The method of claim 40 wherein the carcass is a hog carcass, the carcass processing device includes a splitting saw and the standard processing operation is splitting the carcass.

44. A method of processing a suspended carcass as the carcass is moved along a defined path comprising:
providing a carcass rail having a plurality of trolleys spaced at desired intervals and movable along the rail, each trolley capable of supporting an animal carcass;
providing first and second carcass processing devices each capable of effecting a standard processing operation on a carcass supported by a trolley moving along the carcass rail, the carcass rail passing a trolley sequentially past the first carcass processing device and the second carcass processing device;
providing a controller in communication with the carcass rail, and the first and second carcass processing devices;
moving a plurality of supported carcasses on the carcass rail;
identifying a location along the carcass rail to signify the absence of a supported carcass or the presence of a supported carcass that requires special handling;
sending a signal to the controller with the location along the carcass rail;
moving a plurality of carcasses supported on the trolleys on the carcass rail sequentially past the first carcass processing device and then past the second carcass processing device; and
sending a signal from the controller to the first carcass processing device and to the second carcass processing device to either effect a standard processing operation or to modify the standard processing operation as the trolley at the identified location passes the carcass processing devices.

45. The method of claim 44 wherein the controller signal to the carcass processing devices comprises a signal synchronized with the carcass processing devices and the movement of carcasses along the carcass rail, the signal including a register containing data on processing previously performed on the carcass to be processed by the respective carcass processing device.

46. The method of claim 44 including providing a sensor capable of detecting a mark on a supported carcass, and further including:
providing the identification to the location along the carcass rail by placing a mark on a desired supported carcass on the carcass rail prior to the carcass passing the first and second processing devices to signify a condition of the carcass that requires special handling of the carcass;
identifying with the sensor the carcass having the mark;
sending a signal from the sensor to the controller; and
sending a signal from the controller to the first and second carcass processing devices to effect no operation on the carcass having the mark as the carcass having the mark passes the carcass processing devices.

47. The method of claim 44 including providing a sensor capable of detecting absence of a carcass at the desired interval on the rail, and further including:
providing the identification to the location along the carcass rail by identifying with the sensor the absence of a carcass at the desired interval on the rail prior to the carcass passing the first and second processing devices;
sending a signal from the sensor to the controller; and
sending a signal from the controller to the first and second carcass processing devices to effect no operation at the interval of the rail having no carcass.

48. The method of claim 44 including:
providing a sensor capable of detecting location of a supported carcass on the carcass rail;
providing the identification to the location along the carcass rail by identifying with the sensor the location of a supported carcass;
sending a signal from the sensor to the controller with the location of the carcass;
sending a signal from the controller to the first carcass processing device to effecting a standard processing operation on the carcass identified by the sensor as the identified carcasses passes the carcass processing device; and
sending a signal from the controller to the second carcass processing device to effect no processing operation on the carcass identified by the sensor as the identified carcasses passes the carcass processing device.

49. A method of processing a suspended carcass as the carcass is moved along a defined path comprising:
providing a carcass rail having a plurality of trolleys spaced at desired intervals and movable along the rail, each trolley capable of supporting an animal carcass;
providing a carcass processing device having a splitting saw capable of effecting a splitting operation on a carcass supported by a trolley moving along the carcass rail;
providing a sensor for measuring a size parameter of each carcass moving along the carcass rail;
providing a controller in communication with the carcass rail, the carcass processing device and the sensor;
moving a plurality of supported carcasses on the carcass rail;
measuring a size parameter of each carcass as it moves along the carcass rail;
sending a signal to the controller with the size parameter of each carcass;
using the size parameter, having the controller determine distance to be traveled by the carcass splitting saw to split a desired one of the carcasses; and
sending a signal from the controller to the carcass processing device to move the carcass splitting saw the determined distance to split the desired one of the carcasses.

50. The method of claim 49 wherein the controller signal to the carcass processing device comprises a signal synchronized with the carcass processing device and the movement of carcasses along the carcass rail, the signal including a register containing data on the size parameter of the carcass to be processed by the carcass processing device.

51. The method of claim 49 wherein the sensor is capable of detecting weight of each carcass, and further including:
measuring weight of each carcass as it moves along the carcass rail;

sending a signal to the controller with the weight of each carcass;

using the carcass weight, having the controller determine distance to be traveled by the carcass splitting saw to split a desired one of the carcasses; and sending a signal from the controller to the carcass processing device to move the carcass splitting saw the determined distance to split the desired one of the carcasses.

52. The method of claim 51 wherein the carcass is a hog carcass having a backbone and a back strap adjacent the backbone, the splitting operation is the splitting of the backbone, and the distance determined is the distance of the splitting saw to be traveled to split the backbone completely without splitting the entire back strap of the hog carcass.

53. The method of claim 49 wherein the sensor is capable of detecting length of each carcass, and further including:

measuring length of each carcass as it moves along the carcass rail;

sending a signal to the controller with the length of each carcass;

using the carcass length, having the controller determine distance to be traveled by the carcass splitting saw to split a desired one of the carcasses; and sending a signal from the controller to the carcass processing device to move the carcass splitting saw the determined distance to split the desired one of the carcasses.

54. The method of claim 53 wherein the carcass is a hog carcass having a backbone and a severed head hanging by a pair of jowls with one jowl on each side of the carcass, the splitting operation is the splitting of the backbone, and the distance determined is the distance of the splitting saw to be traveled to split the backbone completely without cutting into the severed head of the hog carcass.

* * * * *